(12) United States Patent
Arita et al.

(10) Patent No.: US 8,729,192 B2
(45) Date of Patent: *May 20, 2014

(54) EPOXY RESIN COMPOSITION, CURED ARTICLE THEREOF, NOVEL EPOXY RESIN, NOVEL PHENOL RESIN AND SEMICONDUCTOR-ENCAPSULATING MATERIAL

(75) Inventors: Kazuo Arita, Ichihara (JP); Ichirou Ogura, Ichihara (JP); Kunihiro Morinaga, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/280,934

(22) PCT Filed: Nov. 10, 2006

(86) PCT No.: PCT/JP2006/322474
§ 371 (c)(1),
(2), (4) Date: Oct. 22, 2008

(87) PCT Pub. No.: WO2007/099674
PCT Pub. Date: Sep. 7, 2007

(65) Prior Publication Data
US 2009/0099303 A1 Apr. 16, 2009

(30) Foreign Application Priority Data
Feb. 28, 2006 (JP) ................. P2006-052537

(51) Int. Cl.
*C08G 65/48* (2006.01)
*C08L 63/00* (2006.01)
*C08F 283/00* (2006.01)
*C08G 59/14* (2006.01)
*C08G 65/38* (2006.01)

(52) U.S. Cl.
USPC ............ 525/390; 525/396; 525/523; 528/219

(58) Field of Classification Search
CPC ... C08G 59/245; C08G 59/3218; G08L 63/00

USPC .................. 525/108, 396, 523, 390; 528/219
See application file for complete search history.

(56) References Cited

U.S. PATENT DOCUMENTS

| | | |
|---|---|---|
| 3,551,519 A | 12/1970 | Dubsky |
| 2009/0069490 A1 | 3/2009 | Ogura et al. |
| 2009/0099303 A1 | 4/2009 | Arita et al. |

FOREIGN PATENT DOCUMENTS

| | | | |
|---|---|---|---|
| CA | 2045291 A | * 12/1991 | ........... C07D 303/28 |
| EP | 0467826 A2 | 1/1992 | |

(Continued)

OTHER PUBLICATIONS

English machine translation of JP Patent Pub No. 08-283379 A, Ogura et al, Oct. 29, 1996.*

(Continued)

*Primary Examiner* — Peter F Godenschwager
*Assistant Examiner* — David Karst
(74) *Attorney, Agent, or Firm* — Westerman, Hattori, Daniels & Adrian, LLP

(57) ABSTRACT

The invention provides an epoxy resin composition, a novel epoxy resin, a novel phenol resin and a semiconductor encapsulating material. The cured article of the epoxy resin composition has superior characteristics in flame retardancy, heat-resistant and curing. The epoxy resin composition is a preferable resin composition using in a semiconductor device or a circuit board device, and has the structure in which a naphthalene structure is bonded with an arylene group through an oxygen atom, and the total number of the aromatic nucleus in both the naphthalene structures and the arylenes group is 2-8. The epoxy resin composition essentially includes an epoxy resin (A) having the glycidoxy group as a substituent in the aromatic nucleus and a curing agent (B).

15 Claims, 11 Drawing Sheets

(56) References Cited

FOREIGN PATENT DOCUMENTS

| | | | | |
|---|---|---|---|---|
| EP | 0559338 | A1 | | 9/1993 |
| EP | 682052 | A1 * | 11/1995 | ............. C08G 59/24 |
| JP | 2-227418 | A | | 9/1990 |
| JP | 4-359919 | A | | 12/1992 |
| JP | 5-132544 | A | | 5/1993 |
| JP | 5-140265 | A | | 6/1993 |
| JP | 05178982 | A * | 7/1993 | ............. C08G 65/34 |
| JP | 05-304001 | A | | 11/1993 |
| JP | 06-263839 | A | | 9/1994 |
| JP | 07-010966 | A | | 1/1995 |
| JP | 8-120039 | A | | 5/1996 |
| JP | 8-127636 | A | | 5/1996 |
| JP | 08283379 | A * | 10/1996 | ............. C08G 59/06 |
| JP | 2003-280192 | A | | 10/2003 |
| JP | 2004-59714 | A | | 2/2004 |
| JP | 2004-307655 | A | | 11/2004 |
| JP | 2005-15689 | A | | 1/2005 |
| JP | 4-359919 | A | | 7/2005 |
| JP | 2005-191069 | A | | 7/2005 |
| JP | 2006-096838 | A | | 4/2006 |
| JP | 2006-307162 | A | | 11/2006 |
| TW | 200504139 | A | | 1/2005 |
| WO | WO 2004113327 | A1 * | 12/2004 | |

OTHER PUBLICATIONS

English machine translation of JP Patent Pub No. 05-178982 A, Mizoguchi et al, Jul. 20, 1993.*
Daito, Computer generated English translation of JP 2005-191069 A, Jul. 14, 2005.*
European Search Report dated Aug. 5, 2009, issued in corresponding European Patent Application No. 06823296.6.
International Search Report of PCT/JP2006/322474, date of mailing Dec. 12, 2006.
International Search Report of PCT/JP2006/305264, date of mailing May 2, 2006.
U.S. Office Action dated Jan. 27, 2010, issued in corresponding U.S. Appl. No. 12/615,459.
Japanese Office Action dated Jul. 29, 2008, issued in corresponding Japanese Patent Application No. 2006-052537, with English translation (10 pages).
Taiwanese Office Action dated Sep. 21, 2012, issued in corresponding Taiwanese Patent Application No. 095141906, with English translation (11 pages).

* cited by examiner

EPOXY RESIN COMPOSITION, CURED ARTICLE THEREOF, NOVEL EPOXY RESIN, NOVEL PHENOL RESIN AND SEMICONDUCTOR-ENCAPSULATING MATERIAL

TECHNICAL FIELD

The present invention relates to an epoxy resin composition which has excellent flame retardancy, heat resistance and curability of its cured article and thus can be suitably used as a resin composition for semiconductor devices, circuit board units, etc.; for use therein, a novel epoxy resin and a novel phenol resin; and a semiconductor-encapsulating material.

BACKGROUND ART

Epoxy resins have been widely used in the fields of electronics and coatings with high levels of functionality because epoxy resins have a low shrinking property at the time of curing and cured articles thereof are excellent in dimensional stability, electrical insulating properties and chemical resistance. However, for example, since there has been required reflow resistance and so on accompanied with transition to surface mounting of a semiconductor, miniaturization of semiconductor itself or a lead-free solder in the field of electronics such as a semiconductor encapsulating material and so on, much more heat impact resistance has been required for electronic element materials, and thus there has been demanded a material of a low melt viscosity in which fillers can be highly filled.

As an epoxy resin having low viscosity satisfying such required properties, for example, there have been known epoxy resin compositions based on a diglycidylether of dihydroxy tri(phenylene ether) (refer to Reference 1 described below).

However, recently in the field of coatings with a high level of functionality, since it has been inevitable to response to environmental problems represented by a dioxin problem and there have been highly demanded a so-called halogen-free flame-retardant system in which a resin itself has a flame retarding effect without using a halogen-type flame retardant in additives, the above-described epoxy resins having tri(phenylene ether) as a main skeleton are not sufficient in a flame retarding effect of cured articles thereof and thus have not manifested a halogen-free flame retarding effect. Further, the above-epoxy resins are insufficient in strength of the resin structure itself and thus inferior in heat resistance of cured articles thereof.

Therefore, there has been a situation in that epoxy resins excellent in fluidity of the resins themselves as well as in flame retardancy and heat resistance of cured articles thereof were not obtained.

Patent Document 1: Japanese Patent Application Laying-Open Publication No. Hei 05-304001.

DISCLOSURE OF THE INVENTION

It is an object of the present invention to provide an epoxy resin composition which not only has good fluidity but also is capable of providing a cured article thereof having excellent flame retardancy and heat resistance, a semiconductor-encapsulating material, a novel epoxy resin, a novel phenol resin, and the cured article of the epoxy resin composition, having excellent flame retardancy as well as in heat resistance.

From the results of careful studies to solve the above subject, the present inventors found that the flame retardancy and heat resistance of a cured article are significantly enhanced by introducing, as a main skeleton a polyaryleneoxy structure essentially having a naphthaleneoxy structure in an epoxy resin structure, so as to achieve the present invention.

That is, the present invention relates to an epoxy resin composition (abbreviated as "epoxy resin (I)", herein below), which contains an epoxy resin (A) having a structure in which a naphthalene structure is bonded with another arylene structure through an oxygen atom, the total number of aromatic nuclei forming the naphthalene structure and the other arylene structure per molecule is from 2 to 8 and the aromatic nucleus has a (meth)glycidyloxy group as a substituent; and a curing agent (B), as an essential component.

Further, the present invention relates to an epoxy resin composition (referred to as "epoxy resin (II)" herein below), which has a phenol resin (B') having a structure in which a naphthalene structure is bonded with another arylene structure through an oxygen atom, the total number of aromatic nuclei forming the naphthalene structure and the other arylene structure per molecule is from 2 to 8 and the aromatic nucleus has a phenol hydroxyl group as a substituent, and an epoxy resin (A'), as an essential component.

Furthermore, the present invention relates to a novel epoxy resin having a structure represented by the following general formula (1):

[Chemical Formula 1]

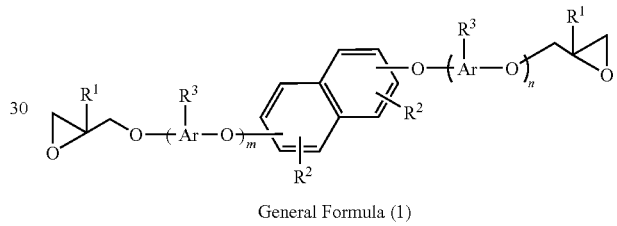

General Formula (1)

In the formula, $R^1$ represents a hydrogen atom or a methyl group; each Ar represents independently a naphthylene group, a phenylene group, or a naphthylene group or a phenylene group having an $C_{1-4}$ alkyl group or a phenyl group as a substituent; each $R^2$ represents independently a hydrogen atom or an $C_{1-4}$ alkyl group; n and m each represent an integer of from 0 to 2, and at least one of n and m is 1 or greater; $R^3$ represents a hydrogen atom or an aromatic hydrocarbon group containing an epoxy group represented by the following general formula (1-2), provided that the total number of the aromatic nuclei in the above general formula (1) is from 2 to 8, and in the above general formula (1), a position of bonding to the naphthalene skeleton may be any of two rings forming the naphthalene ring.

[Chemical Formula 2]

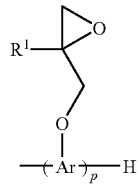

General Formula (1-2)

In the general formula (1-2), $R^1$ represents a hydrogen atom or a methyl group; each Ar represents independently a naphthylene group, a phenylene group, or a naphthylene group or a phenylene group having an $C_{1-4}$ alkyl group or a phenyl group as a substituent; and p represents an integer of 1 or 2.

Furthermore, the present invention relates to a novel phenol resin having a structure represented by the following general formula (2):

[Chemical Formula 3]

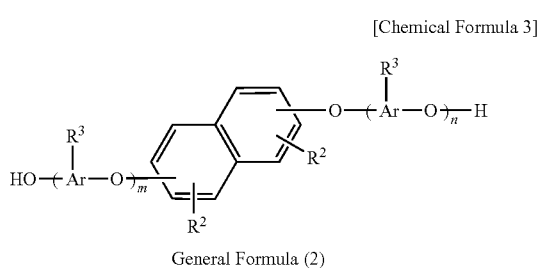

General Formula (2)

In the general formula (2), each Ar represents independently a naphthylene group, a phenylene group, or a naphthylene group or a phenylene group having an $C_{1-4}$ alkyl group or a phenyl group as a substituent; each $R^2$ represents independently a hydrogen atom or an alkyl group of a carbon number of from 1 to 4; n and m each represent an integer of from 0 to 2, and at least one of n and m is 1 or greater; $R^3$ represents a hydrogen atom or an aromatic hydrocarbon group containing a hydroxyl group represented by the following general formula (2-2), provided that the total number of the aromatic nuclei in the general formula (2) is from 2 to 8, and in the above general formula (2), a position of bonding to the naphthalene skeleton may be any of two rings forming the naphthalene ring.

[Chemical Formula 4]

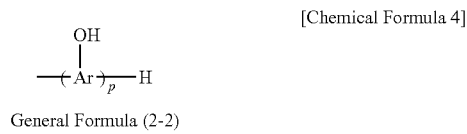

General Formula (2-2)

In the general formula (2-2), each Ar represents independently a naphthylene group, a phenylene group, or a naphthylene group or a phenylene group having an $C_{1-4}$ alkyl group or a phenyl group as a substituent; p represents an integer of 1 or 2.

Furthermore, the present invention relates to a semiconductor encapsulating material, which comprises the epoxy resin composition further containing an inorganic filler (C) in a ratio of 70 to 95 weight % in addition to the epoxy resin (A) and the curing agent (B).

Furthermore, the present invention relates to a semiconductor encapsulating material, which is composed of the epoxy resin composition containing an inorganic filler (C) in a ratio of 70 to 95 weight % in the composition in addition to the epoxy resin (A') and the curing agent (B').

Furthermore, the present invention relates to the epoxy resin cured article formed by curing said epoxy resin composition.

According to the present invention, there can be provided an epoxy resin composition which has good fluidity as well as can provide the cured article thereof having excellent flame retardancy and heat resistance, a semiconductor encapsulating material, a novel epoxy resin, a novel phenol resin, and the cured article of the epoxy resin composition, having excellent flame retardancy as well as in heat resistance.

BEST MODE FOR CARRYING OUT THE INVENTION

Figure 1:
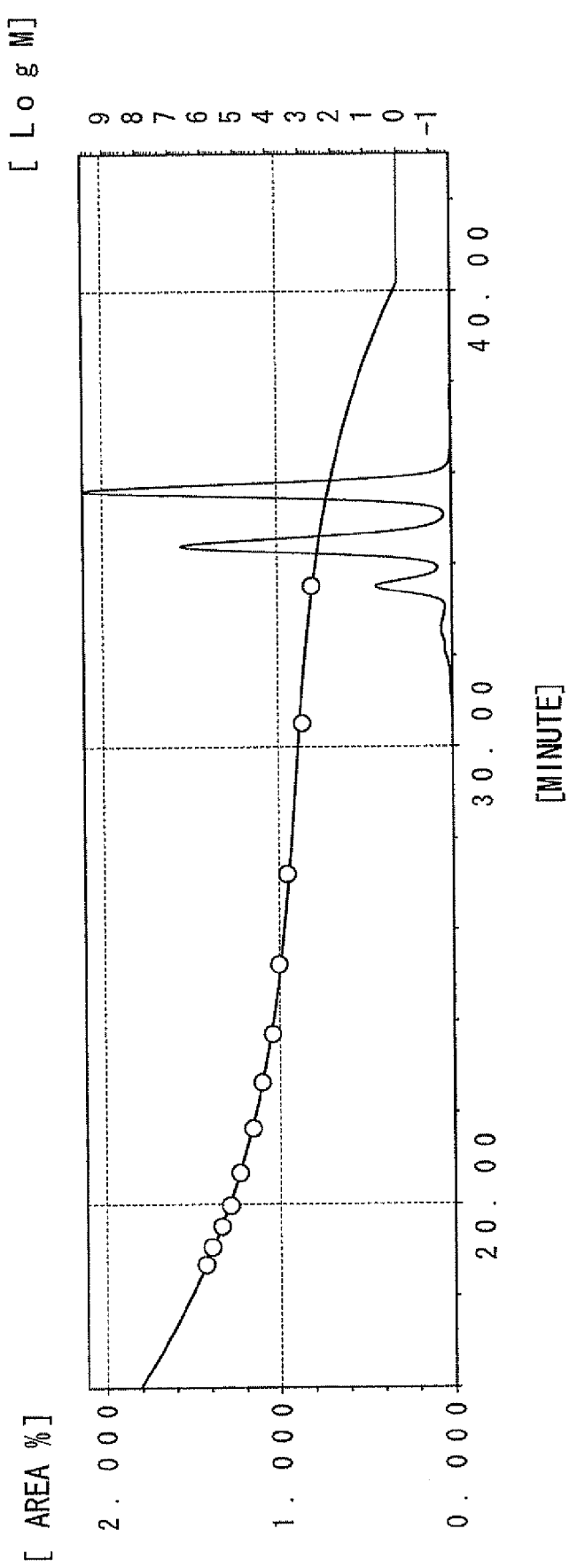
FIG. 1 is a GPC chart of the phenol resin obtained in Example 1.

As described above, the epoxy resin (A) used in the epoxy resin composition (I) of the present invention has, as a main skeleton a structure having an aryleneoxy structure in which a naphthalene structure is bonded with another arylene structure through an oxygen atom and the total number of aromatic nuclei forming the naphthalene structure and the other arylene structure per molecule is from 2 to 8. That is, the naphthalene skeleton is an essential aromatic nucleus part to form the arylene oxy structure, which results in acceleration of char formation at the time of combustion of the cured article so as to manifest excellent flame retardancy.

Meanwhile, since the total number of aromatic nuclei forming said naphthalene structure and the other arylene structure per molecule is from 2 to 8, the epoxy resin has excellent fluidity as well. Here, it is described that the epoxy resin (A) manifests excellent fluidity even though it has an aryleneoxy structure. That is, an aryleneoxy structure is conventionally formed by etherification via a dehydrative condensation reaction of 2-valent phenols, and thus it is generally difficult to control this reaction from resulting in a high molecular weight. Regarding this, since the number of aromatic nuclei per molecule of the epoxy resin (A) is from 2 to 8 in the present invention, the epoxy resin (A) manifests excellent fluidity even though it has an aryleneoxy structure. The number of corresponding aromatic nuclei is preferably 3 to 6 from the aspect of excellent balance of flame retardancy, heat resistance and fluidity.

Here, the naphthalene structure forming the epoxy resin (A) may include a naphthalene structure having from 2 to 4 bonding positions to an oxy group. The naphthalene structure may have an alkyl group having 1 to 4 carbon atom(s) such as a methyl group, an ethyl group, a propyl group, or a t-butyl group; or a phenyl group on the aromatic nucleus thereof, in addition to the oxy group. However, from the aspect of fluidity of the epoxy resin (A), the naphthalene structure preferably has 2 bonding positions to an oxy group, in which the bonding position of the oxy group is preferably 1,3-position, 1,6-position, 1,7-position, 1,8-position, 2,3-position, or 2,7-position. Among these, 1,6-position and 2,7-position are preferable from the aspect of an easiness for production, and 2,7-position is more preferable from the aspect of an excellent balance between fluidity and flame retardancy. Besides, regarding a substituent other than oxy group on the aromatic nucleus, the naphthalene structure preferably has no such a substituent or has a methyl group or a phenyl group, and more preferably has no such a substituent, from the aspect of flame retardancy effect.

The epoxy resin (A) may form a molecular structure in which a plurality of naphthalene structures are bonded together by a direct bonding.

Meanwhile, in the epoxy resin (A), another arylene structure bonded with the naphthalene structure through an oxygen atom may include the above-described naphthalene structure or phenylene structure. Here, the phenylene structure may have 2 or 3 bonding positions to an oxy group, or may have an alkyl group having 1 to 4 carbon atom(s) such as a methyl group, an ethyl group, a propyl group, or a t-butyl group, or a phenyl group on aromatic nucleus thereof.

However, from the aspect of fluidity of the epoxy resin (A), the phenylene structure having 2 bonding positions to an oxy group is preferable, in which the bonding position of an oxy group is preferably 1,3-position, 1,4-position or 1,5-position. Among these, 1,3-position is more preferable from the aspect of an easiness for the production. Besides, regarding a substituent on the aromatic nucleus of the other arylene structure, it is preferable that the arylene structure has no such a substituent or has a methyl group, and particularly preferable is that the other arylene structure has no such a substituent, from the aspect of flame retardant effect. Particularly, the other arylene structure is preferably the above-described naphthalene structure, from the aspect of flame retardancy.

A (methyl)glycidyloxy group in the molecular structure of the epoxy resin (A) is specifically a glycidyloxy group or a β-methylglycidyloxy group, but in the present invention, a glycidyloxy group is particularly preferable from the aspect of flame retardancy of the cured article and easiness for obtaining a raw material in the commercial production and so on.

Specifically, this epoxy resin (A) is preferably a structure represented by the following general formula (1) from the aspect of flame retardant effect. In this case, the corresponding epoxy resin (A) is a novel epoxy resin of the present invention.

[Chemical Formula 5]

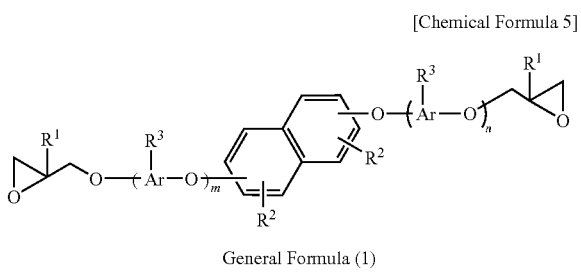

General Formula (1)

In general formula (1), $R^1$ represents a hydrogen atom or a methyl group; each Ar represents independently a naphthylene group, a phenylene group, or a naphthylene group or a phenylene group having an $C_{1-4}$ alkyl group or a phenyl group as a substituent; each $R^2$ represents independently a hydrogen atom or an $C_{1-4}$ alkyl group; n and m each represent an integer of from 0 to 2, and at least one of n and m is 1 or greater; $R^3$ represents a hydrogen atom or an aromatic hydrocarbon group containing an epoxy group represented by the following general formula (1-2), provided that the total number of the aromatic nuclei in the formula (1) is from 2 to 8, and in the above general formula (1), the position of bonding to the naphthalene skeleton may be any of two rings forming the naphthalene ring.

[Chemical Formula 6]

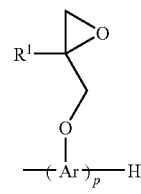

General Formula (1-2)

In the general formula (1-2), $R^1$ represents a hydrogen atom or a methyl group; each Ar represents independently a naphthylene group, a phenylene group, or a naphthylene group or a phenylene group having an $C_{1-4}$ alkyl group or a phenyl group as a substituent; p represents an integer of 1 or 2.

In the epoxy resin (A) represented by the general formula (1), as described above, the position of bonding to an oxy group in the naphthalene structure is preferably 1,6-position or 2,7-position, and, when the other arylene structure is a phenylene group, the position bonding to an oxy group in the arylene structure is preferably 1,3-position, and in the general formula (1), $R^2$ is preferably a hydrogen atom. Accordingly, the preferred one among the epoxy resin (A) may include, for example, an epoxy resin represented by the following structural formulas E-1 to E-17 in which the position bonding to an oxy group in the naphthalene structure is 1,6-position.

[Chemical Formula 7]

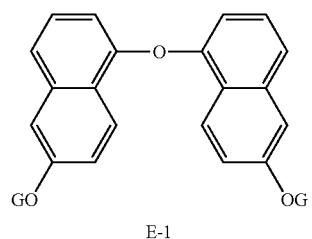

E-1

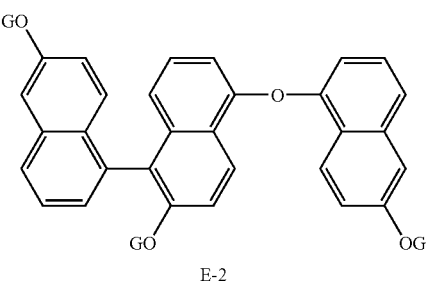

E-2

-continued
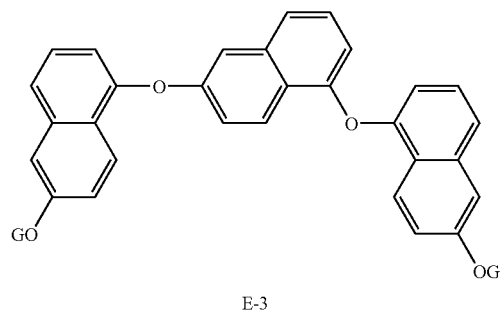
E-3
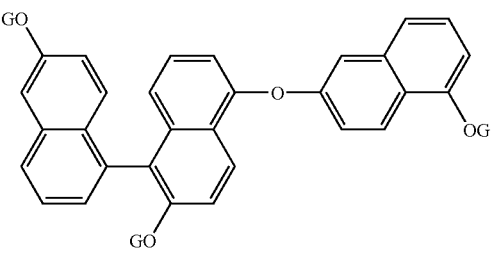
E-4
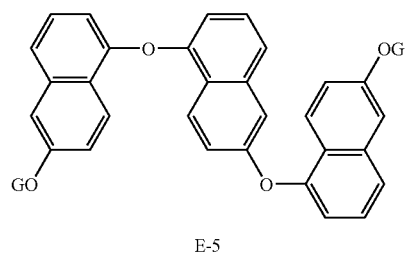
E-5
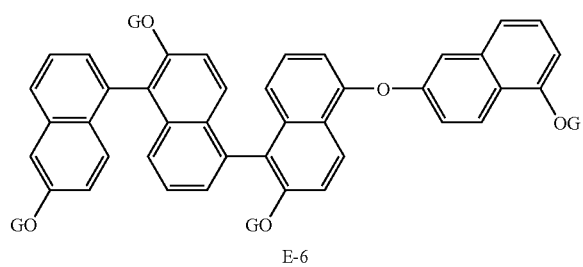
E-6
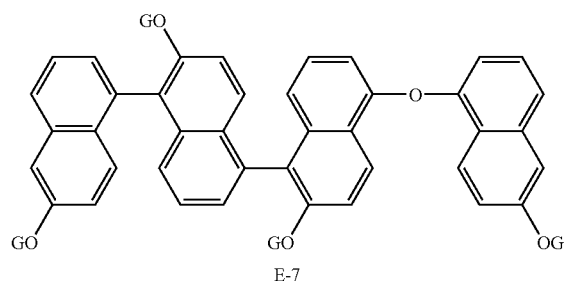
E-7
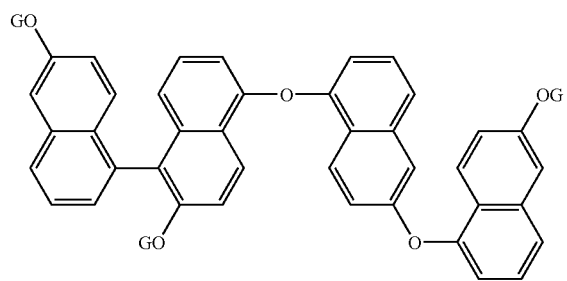
E-8
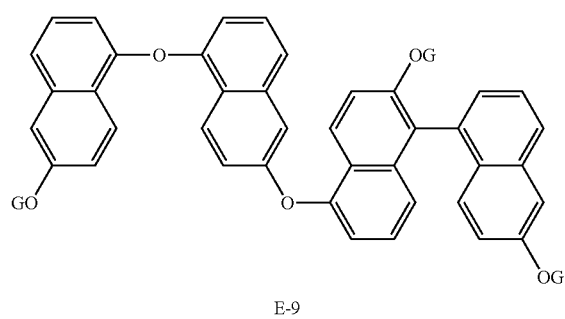
E-9
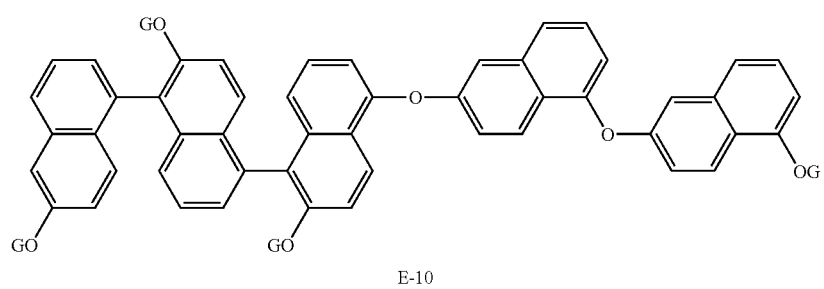
E-10

[Chemical Formula 8]
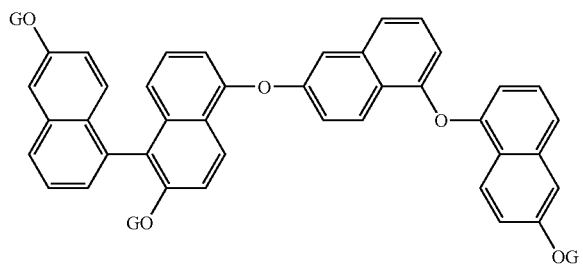
E-11
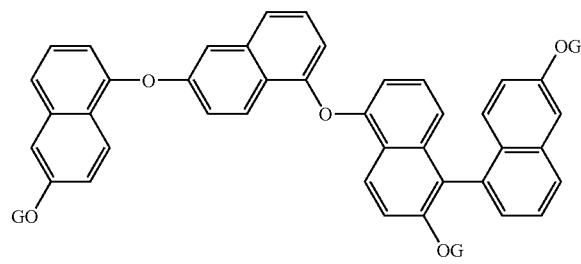
E-12
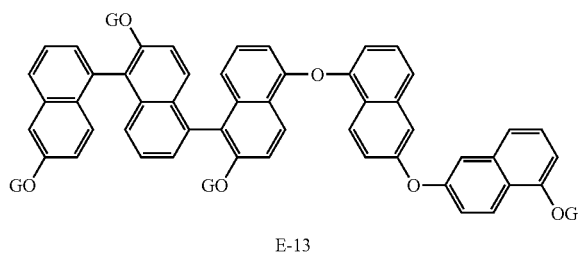
E-13
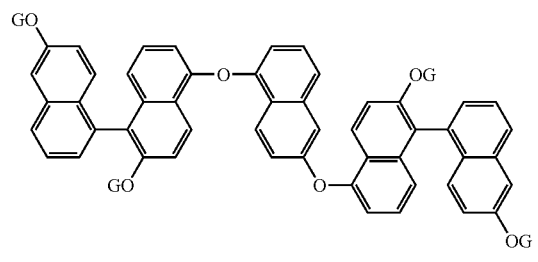
E-14
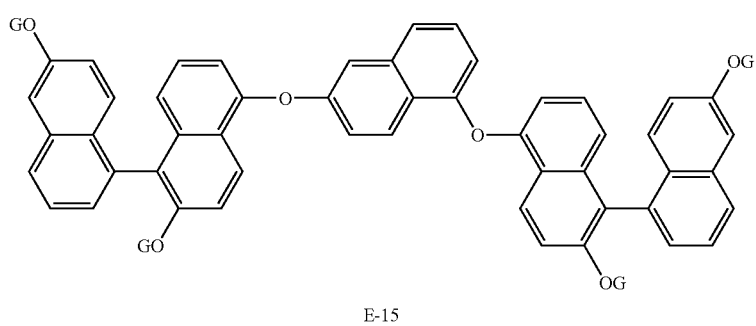
E-15
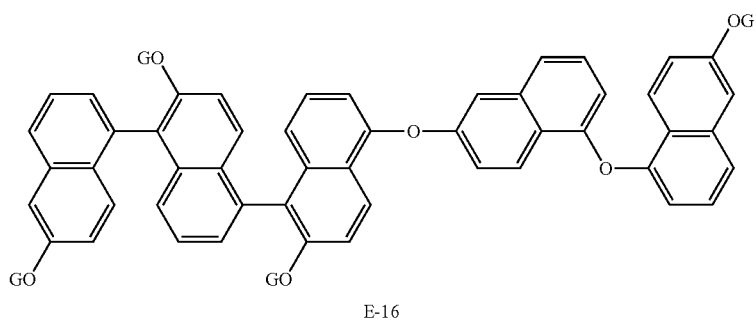
E-16
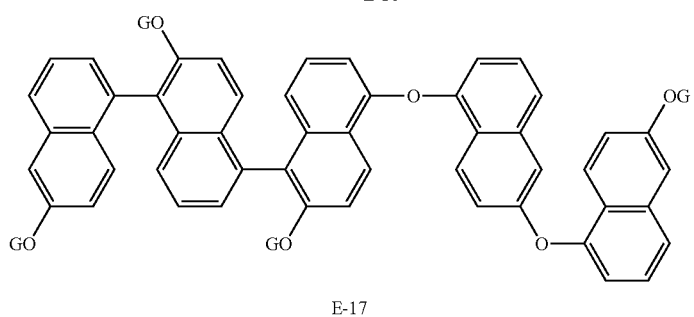
E-17

Next, for example, as the epoxy resin (A) in which the position bonding to an oxy group is 2,7-position, those represented by the following structural formulas E-18 to E-25 may be mentioned:
[Chemical Formula 9]
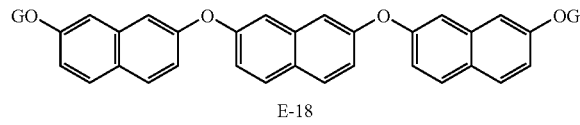
E-18
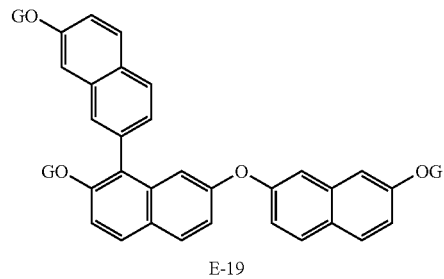
E-19
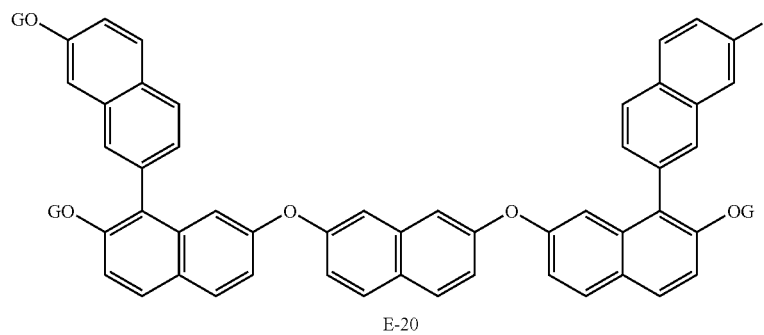
E-20
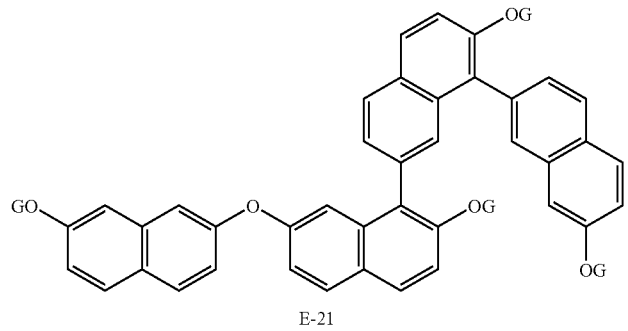
E-21
[Chemical Formula 10]
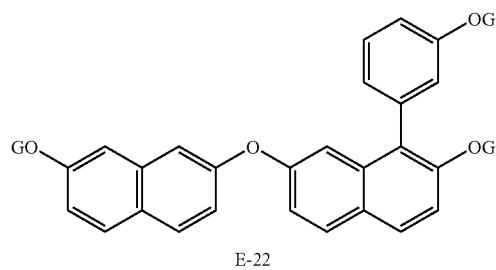
E-22
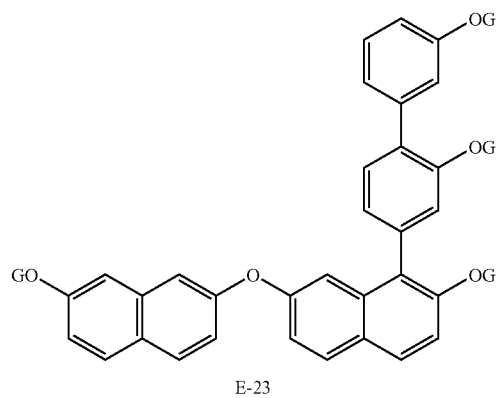
E-23
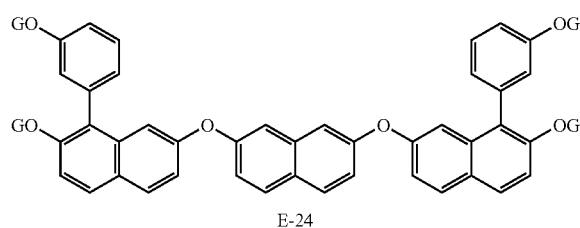
E-24
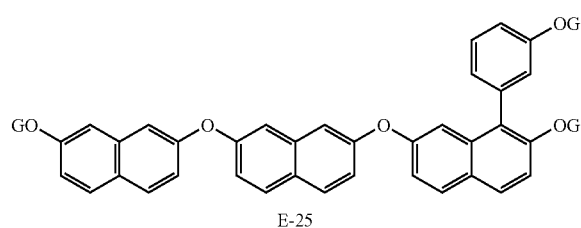
E-25

In the above structural formulas E-1 to E-25, "G" denotes a glycidyl group. The epoxy resin (A) may be used individually as each of the compounds, or as a mixture of a plurality of the compounds.

As described above, it is preferable that the epoxy resin (A) has a structure in which a naphthalene structure is bonded with another naphthalene structure through an oxygen atom in that a cured article thereof has better flame retardancy as well as good heat resistance. Specifically, this epoxy resin may be represented by, for example, the following general formula (3).

[Chemical Formula 11]

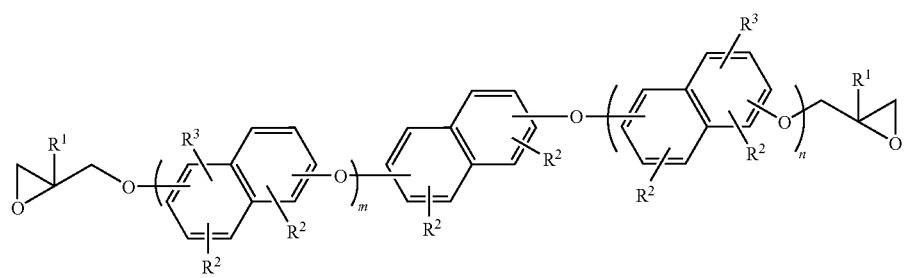

General Formula (3)

In the general formula (3), each $R^1$ represents independently a hydrogen atom or a methyl group; each $R^2$ represents independently a hydrogen atom or an $C_{1-4}$ alkyl group; n and m each represent an integer of from 0 to 2, and at least one of n and m is 1 or greater; $R^3$ represents a hydrogen atom or the following general formula (3-2), provided that the total number of aromatic nuclei in the general formula (3) is from 2 to 8, and a position bonding to the naphthalene skeleton in the above general formula (3) may be any of two rings forming the naphthalene ring:

[Chemical Formula 12]

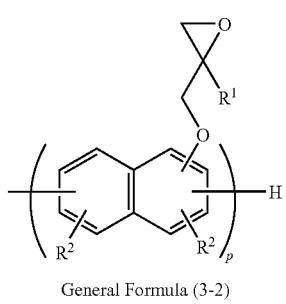

General Formula (3-2)

in which, each $R^1$ represents independently a hydrogen atom or a methyl group; each $R^2$ represents independently a hydrogen atom or an $C_{1-4}$ alkyl group; p represents an integer of 1 or 2.

Also in the above general formula (3), $R^2$ is preferably a hydrogen atom, and specific examples thereof may include compounds represented by above structural formula E-1 to E-21. Moreover, the compounds represented by the above structural formula E-18 to E-21 in which a position bonding to an oxy group is 2,7-position are preferred from the aspect of excellent flame retardancy and heat resistance, and particularly, it is preferable to use a mixture of the compounds represented by the structural formulas E-18, E-19 or E-20 from the aspect of an excellent balance between flame retardancy and fluidity. The total number of aromatic nuclei in the general formula (3) is particularly preferred to be 3 to 6 from the aspect of an excellent balance of flame retardancy, heat resistance and fluidity.

The epoxy resin (A) described above can be obtained, for example, by reacting a multivalent hydroxynaphthalene such as 2-valence to 4-valence, or a mixture of the multivalent hydroxynaphthalenes such as 2-valence to 4-valence and multivalent hydroxybenzenes such as 2-valence or 3-valence in the presence of an acid catalyst, then, repeatedly extracting a low molecular weight product with an organic solvent, and carrying out glycidylation of the thus-obtained phenol resin.

However, it is preferable in the present invention that the epoxy resin (A) is synthesized by reacting in the presence of a basic catalyst to obtain a phenol resin, and then performing the glycidylation of the phenol resin, from the aspect of excellent productivity of the epoxy resin (A). Particularly, in the present invention, it is preferable that the epoxy resin (A) is synthesized by reacting dihydroxynaphthalenes or a mixture of dihydroxynaphthalenes and dihydroxybenzenes (abbreviated as "difunctional phenols", below) in the presence of a basic catalyst to obtain a phenol resin, and then performing the glycidylation of the phenol resin, from the aspect of excellent productivity of the epoxy resin (A).

That is, the latter synthetic method includes a process for obtain a phenol resin by reacting dihydroxynaphthalenes (a1) or a mixture of dihydroxynaphthalenes (a1) and dihydroxy benzenes (a2) in the presence of a basic catalyst (referred to as "Process 1" in abbreviation, below), and a process for glycidylation by subsequently reacting the obtained phenol resin with epihalohydrin (referred to as "Process 2" below).

Here, the above dihydroxynaphthalenes (a1) useful in Process 1 may include, for example, 1,3-dihydroxynaphthalene, 1,6-dihydroxynaphthalene, 1,7-dihydroxynaphthalene, 1,8-dihydroxynaphthalene, 2,3-dihydroxynaphthalene, or 2,7-dihydroxynaphthalene. Among these, are particularly preferred the compounds having an orientation at the position adjacent to the phenol hydroxyl group in the aromatic nucleus bonded with a phenol hydroxyl group, and specifically, 1,3-dihydroxynaphthalene, 1,6-dihydroxynaphthalene, 1,8-dihydroxynaphthalene, or 2,7-dihydroxynaphthalene are preferred. In addition, 1,6-dihydroxynaphthalene or 2,7-dihydroxynaphthalene is preferable from the aspect of an easiness for the production, and particularly, 2,7-dihydroxynaphthalene is preferable from the aspect of an excellent balance of fluidity and flame retardancy of the obtained epoxy resin (A).

The above dihydroxybenzenes (a2) are not particularly limited as far as compounds have two hydroxyl groups on a benzene ring. Examples thereof may include 1,3-dihydroxy benzene, 1,4-dihydroxy benzene, 1,5-dihydroxy benzene, 2,3,5-trimethyl-1,4-dihydroxy benzene, or 5-phenyl-1,3-dihydroxy benzene. Among these, those having an orientation at a position adjacent to the phenol hydroxyl group in aromatic nucleus bonded with phenol hydroxyl group are particularly preferable, and specifically, 1,3-dihydroxy benzene or 5-phenyl-1,3-dihydroxy benzene are preferable. Among these, 1,3-dihydroxy benzene is particularly preferable from the aspect of an excellent reactivity in the presence of a basic catalyst.

Among these, using dihydroxynaphthalenes (a1) alone is particularly preferable in that the effects of flame retardancy and heat resistance of the cured article of the obtained epoxy resin becomes significant. Using a mixture of dihydroxynaphthalenes (a1) and dihydroxybenzenes (a2) is preferable since fluidity of the epoxy resin (A) is excellent.

The basic catalyst used as a reaction catalyst in Process 1 may include specifically alkaline metal hydroxides such as sodium hydroxide, or potassium hydroxide; alkaline metal carbonates such as sodium carbonate, or potassium carbonate; or phosphorous-based compounds such as triphenyl phosphine. These basic catalysts may be used individually or in combination of 2 or more kinds thereof.

The amount of the basic catalyst to be used may be properly selected according to the kind of the basic catalyst, a purposed reaction rate and so on. For example, when alkaline metal hydroxide is used, the amount is 0.01 to 0.5 mol, and preferably 0.01 to 0.1 mol per 1 mole of phenol hydroxyl group of the difunctional phenols (a).

What is particularly described herein is that, when the difunctional phenols are made to polyether, an acid catalyst such as para-toluenesulfonic acid or methanesulfonic acid has been conventionally used, but in this case, the degree of polymerization cannot be controlled, thus resulting in a very high melting point or a high molecular weight product which may not melt until the decomposition point, and therefore, application to electronic element materials requiring high fluidity is difficult. Regarding this, by using a basic catalyst as a reaction catalyst in the present invention, the phenol resin having a total number of nuclei of from 2 to 8 and preferably 3 to 6 is obtained surprisingly while the reaction product is not subject to having a high molecular weight. Accordingly, the epoxy resin of the present invention is to be a material having excellent flame retardancy as well as high fluidity.

The reaction in Process 1 may be carried out solvent-free or under a soluble solvent which can form a homogeneous solution, according to properties of dihydroxynaphthalene compound (a1) or dihydroxybenzenes (a2) to be used. When carried out solvent-free, a solvent recovery process is not needed, thus which is preferable, but carrying out in the solvent is preferable in order to stably perform the reaction.

As the above soluble solvent, examples thereof may include alcohols such as benzyl alcohol, cyclohexanol, or amyl alcohol; ethyleneglycols such as ethylene glycol, diethyleneglycol, triethyleneglycol, or polyethyleneglycol; monoethers or diethers of ethyleneglycol or diethyleneglycol, such as ethyleneglycol monomethylether, ethyleneglycol monoethylether, ethyleneglycol monopropyether, diethyleneglycol monomethylether, diethyleneglycol monoethylether, diethyleneglycol monopropyether, diethyleneglycol monobutylether, ethyleneglycol dimethylether, ethyleneglycol diethyl ether, ethyleneglycol dipropyether, diethyleneglycoldimethyl ether, diethyleneglycol diethylether, or diethyleneglycol dipropyether; chlorobenzene; or nitrobenzene. These organic solvents may be used individually or in combination of 2 or more kinds thereof. By using these soluble solvents, precipitation of dihydroxynaphthalenes (a1) or dihydroxybenzenes (a2) can be prevented so as to stably obtain the phenol resin.

In the reaction of Process 1, the basic catalyst in the difunctional phenols (a) is dissolved solvent-free or under the soluble solvent and the reaction can be carried out at a temperature condition of about 100 to 300° C. and preferably 150 to 250° C. The reaction time is not particularly limited but is preferred to be in a range in which the temperature condition can be maintained for 1 to 10 hours. In the reaction of Process 1, it is preferable to distill off water produced during the reaction out of the system by using a fractional distillation column and so on, which makes the reaction proceed rapidly so as to enhance productivity.

When the obtained phenol resin is strongly colored, an antioxidant or reducing agent may be added in Process 1. The antioxidant may include, for example, hindered phenol-type compounds such as 2,6-dialkylphenol derivatives, 2-valent sulfur-based compounds, 3-valent phosphorous atom-containing phosphorous acid ester-type compounds and so on. The reducing agent may include, for example, hypophosphorous acid, phosphorous acid, thiosulfuric acid, sulfurous acid, hydrosulfurous acid salts, or salts thereof.

After the termination of the reaction, the reaction product may be solidified itself to be taken out, or subsequently subject to the glycidylation reaction as Process 2 by adding epihalohydrin. Or, the catalyst may be removed by neutralization treatment, washing treatment or decomposition and then the phenol resin can be separated by general operations such as extraction, or distillation. The neutralization treatment or washing treatment can be performed according to general methods, and, for example, an acidic material such as hydrochloric acid, oxalic acid, acetic acid, sodium phosphate monobasic, or carbonic acid gas may be used.

The phenol resin thus-obtained may be used as being a mixture of a plurality of kinds thereof in various applications, but, if necessary, the content of the unreacted 2-functional phenols (a) may be reduced by further performing a separating operation such as distillation, column treatment, or alkaline aqueous solution extraction; and each product may be isolated as a single component.

Next, Process 2 is a process for glycidylation by reacting the phenol resin obtained in Process 1 with epihalohydrins (a3). Specifically, there may be mentioned a method in which the phenol resin and the epihalohydrins (a3) are reacted in the presence of a basic catalyst. Here, an introducing ratio of the phenol resin and the epihalohydrins (a3) is preferably 2 to 10 moles of the epihalohydrins (a3) per 1 mole of aromatic hydroxyl group in the phenol resin, and an amount of the basic catalyst to be used is preferably in a range of 0.9 to 2.0 moles-per 1 mole of aromatic hydroxyl group in the phenol resin, from as aspect of reactivity or easiness for purification after the termination of the reaction. As a specific reaction method in Process 2, there may be mentioned by a method in which the phenol resin and the epihalohydrins (a3) are introduced into a reaction vessel in a predetermined ratio and reacted at a temperature of 20 to 120° C. for 0.5 to 10 hours while adding all at once or slowly the basic catalyst.

The basic catalyst used herein may be used as a solid form or as an aqueous solution thereof. When the basic catalyst is used as an aqueous solution thereof, a method may be employed in which the solution is continuously added while water and the epihalohydrins (a3) are continuously distilled off from the reaction mixture under a reduced pressure or atmospheric pressure and then water is separated and removed and the epihalohydrins (a3) are continuously recycled into the reaction mixture.

The epihalohydrins (a3) may include, for example, epichlorohydrin, epibromohydrin, or β-methylepichlorohydrin, and among these, epichlorohydrin is preferred from the aspect of easiness for commercial acquisition. When performing the commercial production, it is preferable that, in the reactions in the next and later batches after the termination of the reaction in the first batch for the epoxy resin production, the epihalohydrins (a3) recycled from the crude reaction product are used in combination with fresh epihalohydrins (a3) corresponding to an amount of the decreased epihalohydrins (a3) as the epihalohydrins are consumed in the reaction.

The basic catalyst may include, for example, alkaline earth metal hydroxides, alkaline metal carbonates, or alkaline metal hydroxides. Particularly, alkaline metal hydroxides are preferable from the aspect of excellent activity in the synthetic reaction of the epoxy resin, and, for example, sodium hydroxide, potassium hydroxide may be mentioned. In the use thereof, these basic catalysts may be used as in an aqueous solution of about 10 to 55 weight % or as in a solid form. The reaction rate in the synthesis of the epoxy resin can be accelerated by using an organic solvent in combination. This organic solvent is not particularly limited but may include, for example, ketones such as acetone, or methyl ethyl ketone; alcohols such as methanol, ethanol, 1-propyl alcohol, isopropyl alcohol, 1-butanol, or sec-butanol, tert-butanol; cellosolves such as methyl cellosolve, or ethyl cellosolve; ethers such as tetrahydrofuran, 1,4-dioxan, 1,3-dioxan, or diethoxyethane; aprotic polar solvents such as acetonitrile, dimethylsulfoxide, or dimethylformamide. These organic solvents may be used individually, or in a combination of suitable 2 or more kinds thereof in order to control polarity.

After washing the reaction product from the epoxidation reaction as described above, the unreacted epihalohydrin or the combined organic solvent is removed by distillation. In order to obtain the epoxy resin having a low content of hydrolyzable halogens, the obtained epoxy resin is again subjected to the reaction by dissolving the obtained epoxy resin in an organic solvent such as toluene, methyl iso-butyl ketone, or methyl ethyl ketone, and added with an aqueous solution of an alkaline metal hydroxide such as sodium hydroxide, potassium hydroxide. In this case, a phase transfer catalyst such as quaternary ammonium salts, or crown ethers may be present. When the phase transfer catalyst is used, its amount to be used is preferably in a range of 0.1 to 3.0 weight % with respect to the epoxy resin to be used. After the termination of the reaction, the produced salt is removed by filtration and washing, and again, the solvent such as toluene, or methyl iso-butyl ketone is distilled off, and thereby, the epoxy resin (A) of high purity can be obtained.

Since the epoxy resin (A) thus-obtained is commonly obtained as a mixture of the compounds of each structure as described above, the epoxy resin (A) in the present invention may be used as being this mixture. Moreover, the reaction product contains a high molecular weight compound having a 2-hydroxypropylene group, which is produced by the reaction between an epoxy group and the phenol resin that is a precursor for the epoxy resin (A); or diglycidylethers of difunctional phenols which is a raw component. Therefore, the epoxy resin (A) of the present invention may be used as being a mixture containing this high molecular weight compound or raw component (referred as "mixture ($\alpha$)" in abbreviation, herein below). As described above, since the number of nuclei of the epoxy resin (A) can be suppressed to be low in the present invention, it is preferable that the mixture ($\alpha$) is used as a mixture of the epoxy resin (A) with the diglycidylethers of the difunctional phenols. The content of the diglycidylethers of the difunctional phenols in the mixture ($\alpha$) is preferably 5 to 80% as an area ratio in the measurement by GPC, from the aspect of fluidity of the epoxy resin composition.

The epoxy resin (A) specifically described above is preferable in which an epoxy equivalent in the mixture ($\alpha$) is in a range of 100 to 400 g/eq. since the obtained epoxy resin has good fluidity, the epoxy resin composition excellent in curability can be obtained and the cured article thereof is excellent in heat resistance.

A melt viscosity of the epoxy resin (A) is preferably 5.0 to 0.1 mPa·s at 150° C. in the mixture ($\alpha$) since fluidity of the obtained epoxy resin becomes better.

Next, as the epoxy resin component in the epoxy resin composition (I) of the present invention, the epoxy resin (A) or mixture ($\alpha$) may be used individually, or the epoxy resin (A) or mixture ($\alpha$) may be used in combination with other epoxy resins as far as the effects of the present invention are not deteriorated. When used in combination with other epoxy resins, the proportion of the epoxy resin (A) with respect to the total weight of the epoxy resin components is preferably at least 30% by weight, more preferably at least 40% by weight.

As the other epoxy resins to be combined with, various epoxy resins may be used, and examples thereof may include bisphenol A type epoxy resin, bisphenol F type epoxy resin, biphenyl type epoxy resin, tetramethyl biphenyl type epoxy resin, phenol novolac type epoxy resin, cresol novolac type epoxy resin, triphenylmethane type epoxy resin, tetraphenylethane type epoxy resin, dicyclopentadiene-phenol addition reaction type epoxy resin, phenolaralkyl type epoxy resin, naphthol-novolac type epoxy resin, naphtholaralkyl type epoxy resin, naphthol-phenol co-condensed novolac type epoxy resin, naphthol-cresol co-condensed novolac type epoxy resin, aromatic hydrocarbon formaldehyde resin-modified phenol resin type epoxy resin, or biphenyl-modified novolac type epoxy resin. Among these epoxy resins, the tetramethyl biphenyl type epoxy resin, biphenylaralkyl type epoxy resin or novolac type epoxy resin are preferably used particularly in that the cured article having excellent flame retardancy can be obtained.

As the curing agent (B) used in epoxy resin composition (1) of the present invention, there may be used various kinds of known curing agents for epoxy resins, for example, curing agents such as amine-based compounds, amide-based compounds, acid anhydride-based compounds, or phenol-based compounds. Specifically, examples of the amine-based compounds may include diaminodiphenylmethane, diethylenetriamine, triethylenetetramine, diaminodiphenyl sulfone, isophoronediamine, imidazoles, $BF_3$-amine complexes, or guanidine derivatives, examples of the amide-based compounds may include dicyandiamide, or polyamide resin synthesized from a dimer of linolenic acid and ethylenedimaine, examples of the acid anhydride-based compounds may include phthalic anhydride, trimellitic anhydride, pyrotrimellitic anhydride, maleic anhydride, tetrahydrophthalic anhydride, methylhexahydrophthalic anhydride, methylnadic anhydride, hexahydro phthalic anhydride, or methyl hexahydro phthalic anhydride, examples of the phenol-based compounds may include multivalent phenol compounds such as phenol novolac resins, cresol novolac resins, aromatic hydrocarbon formaldehyde resin-modified phenol resins, dicyclopentadiene phenol adduct type resins, phenolaralkyl resins, naphtholaralkyl resins, trimethylolmethane resins, tetraphenylolethane resins, naphthol novolac resins, naphthol-phenol co-condensed novolac resins, naphthol-cresol co-condensed novolac resins, biphenyl-modified phenol resins (multivalent phenol compounds in which phenol nuclei are connected by bismethylene group), biphenyl-modified naphthol resins (multivalent naphthol compounds in which phenol nuclei are connected by bismethylene group), or aminotriazine-modified phenol resins (multivalent phenol compounds in which phenol nuclei are connected by melamine or benzoguanamine), or the phenol resin (B') used in the epoxy resin composition (II) of the present invention.

Among these, particularly the compounds containing many aromatic skeletons in the molecule are preferable from the aspect of flame retardancy effect, and specifically preferred are phenol novolac resins, cresol novolac resins, aromatic hydrocarbon formaldehyde resin-modified phenol resins, phenolaralkyl resins, naphtholaralkyl resins, naphthol novolac resins, naphthol-phenol co-condensed novolac resins, naphthol-cresol co-condensed novolac resins, biphenyl-modified phenol resins, biphenyl-modified naphthol resins, or aminotriazine-modified phenol resins, from the aspect of excellent flame retardancy.

In the present invention, however, the phenolaralkyl resins and the phenol resin (B') used in the epoxy resin composition (II) are particularly preferable since flame retardancy is significantly enhanced and excellent dielectric property is manifested.

The combined amount of the curing agent (B) and the epoxy resin (A) in the epoxy resin composition (I) of the present invention is preferably such that the amount of the active group in the curing agent (B) is from 0.7 to 1.5 equivalents per 1 equivalent of the total epoxy group in the epoxy resin containing the epoxy resin (A) since the cured article has good mechanical properties.

Next, another epoxy resin composition (II) of the present invention essentially comprises, as described above, the phenol resin (B') having a structure in which the naphthalene structure is bonded with another arylene structure through an oxygen atom, the total number of aromatic nuclei forming the naphthalene structure and the other arylene structure per molecule is from 2 to 8, and the aromatic nucleus has a phenol hydroxyl group as a substituent, and the epoxy resin (A').

Here, since the phenol resin (B') has a polyaryleneoxy structure in which the naphthalene structure in the molecule of the epoxy resin is bonded with another arylene structure through an oxygen atom, like in the epoxy resin (A), char formation at the combustion of the cured article is accelerated so as to manifest excellent flame retardancy as well as good heat resistance of the cured article. The total number of aromatic nuclei per molecule is from 2 to 8 and preferably from 3 to 6, which results in excellent fluidity as well.

Here, the naphthalene structure forming the phenol resin (B'), like the epoxy resin (A), may include a naphthalene structure having from 2 to 4 bonding positions to an oxy group, and the naphthalene structure may also have an alkyl group having 1 to 4 carbon atom(s) such as a methyl group, an ethyl group, a propyl group, or a t-butyl group, or a phenyl group on the aromatic rings thereof, in addition to the oxy group. However, from the aspect of fluidity of said phenol resin (B'), the naphthalene structure is preferable to have 2 bonding positions to an oxy group, specifically in which the position of bonding to an oxy group is preferably 1,3-position, 1,6-position, 1,7-position, 1,8-position, 2,3-position, or 2,7-position. Among these, 1,6-position or 2,7-position is preferable from the aspect of an easiness for production, and 2,7-position is more preferable from the aspect of an excellent balance between fluidity and flame retardancy. Further, regarding a substituent other than the oxy group on the aromatic nucleus, it is preferable that the naphthalene structure has no such substituent or has a methyl group or a phenyl group substituent, and particularly preferred that the naphthalene structure has no such substituent from the aspect of flame retardancy.

The phenol resin (B') may form a molecular structure in which a plurality of naphthalene structures form a direct bonding.

Meanwhile, in the phenol resin (B'), the other arylene structure bonded with the naphthalene structure through an oxygen atom may include the naphthalene structure and phenylene structure. Here, the phenylene structure may include one having 2 or 3 bonding positions to an oxy group, and may have an alkyl group having 1 to 4 carbon atom(s) such as a methyl group, an ethyl group, a propyl group, or a t-butyl group, or a phenyl group on the aromatic rings thereof, like the naphthalene structure. However, from the aspect of fluidity of the phenol resin (B'), the phenylene structure having 2 bonding positions to an oxy group is preferable, in which the position of bonding to an oxy group may be preferably 1,3-position, 1,4-position or 1,5-position, however, 1,3-position is preferable from the aspect of an easiness of production. Further, regarding a substituent on the aromatic nucleus of the other arylene structure, it is preferable that the arylene structure has no such substituent or has a methyl group or phenyl group substituent, and particularly preferred that the arylene structure has no such substituent, particularly from the aspect of flame retardancy. It is provided that such another arylene structure is preferably the above-described naphthalene structure, from the aspect of flame retardancy.

Specifically, this phenol resin (B') is preferably a structure represented by the following general formula (2) from the aspect of flame retardancy. In this case, the corresponding phenol resin (B') is a novel phenol resin of the present invention.

[Chemical Formula 13]

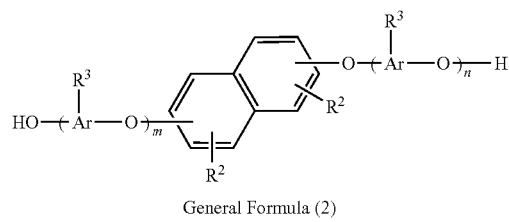

General Formula (2)

In the general formula (2), each Ar represents independently a naphthylene group, a phenylene group, or a naphthylene group or a phenylene group having an $C_{1-4}$ alkyl group or a phenyl group as a substituent; each $R^2$ represents independently a hydrogen atom or an $C_{1-4}$ alkyl group; n and m each represent an integer of from 0 to 2, and at least one of n and m is 1 or greater; $R^3$ represents a hydrogen atom or an aromatic hydrocarbon group containing a hydroxyl group represented by the following general formula (2-2).

[Chemical Formula 14]

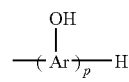

General Formula (2-2)

in the general formula (2-2), each Ar represents independently a naphthylene group, a phenylene group, or a naphthylene group or a phenylene group having an $C_{1-4}$ alkyl group or a phenyl group as a substituent; p represents an integer of 1 or 2.

In the phenol resin (B') represented by the general formula (2), as described above, the position of bonding to an oxy group in the naphthalene structure is preferably 1,6-position or 2,7-position, and, when the other arylene structure is the phenylene group, the position of bonding to an oxy group in the phenylene structure is preferably 1,3-position, and in the general formula (2), $R^2$ is preferably a hydrogen atom. Accordingly, the phenol resin (B') is preferably a compound represented by the following structural formula P-1 to P-17 in which the position of bonding to an oxy group in the naphthalene structure is 1,6-position.

[Chemical Formula 15]

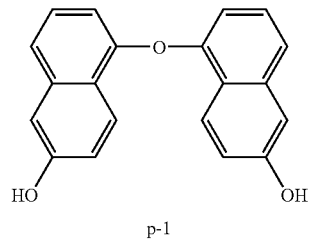
p-1

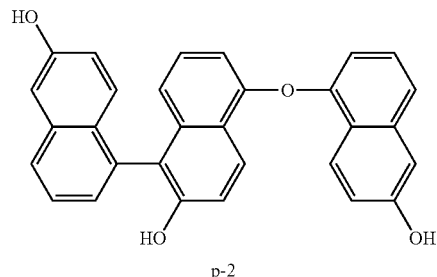
p-2

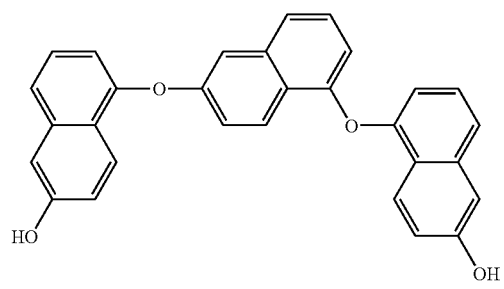
p-3

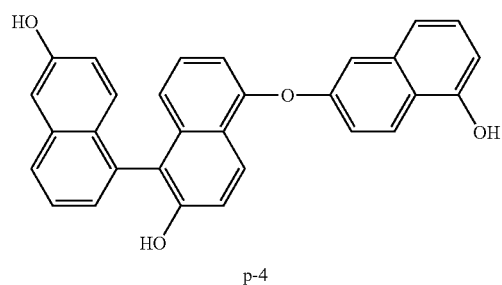
p-4

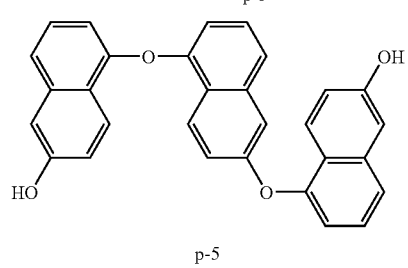
p-5

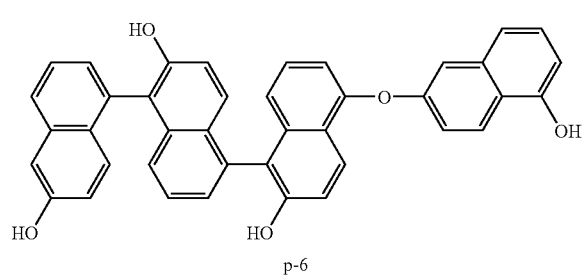
p-6

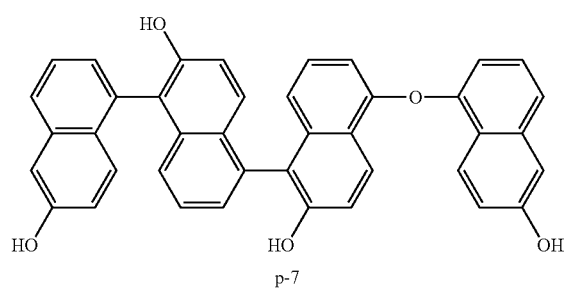
p-7

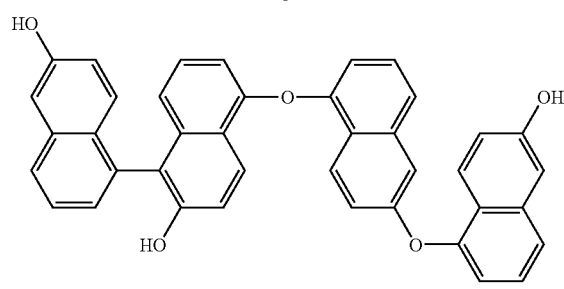
p-8

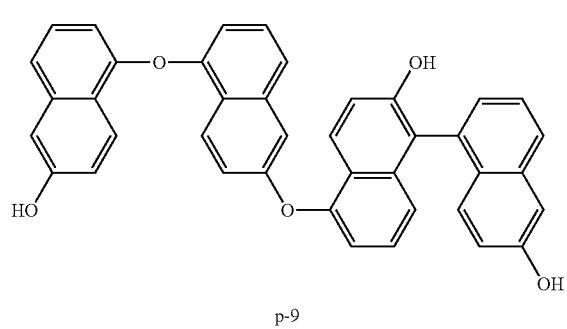
p-9

-continued
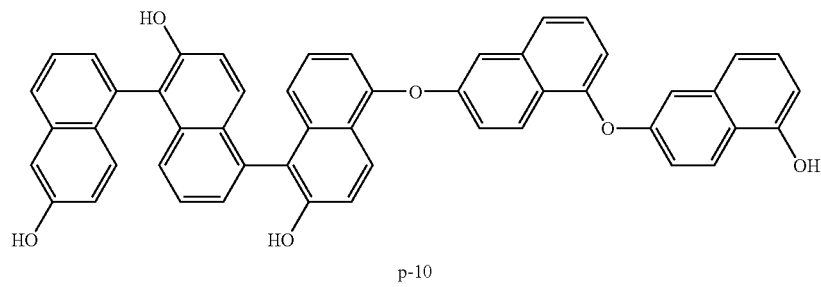
p-10
[Chemical Formula 16]
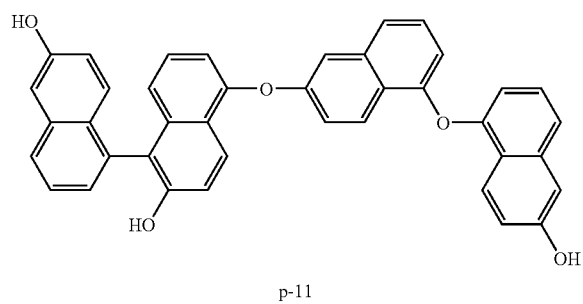
p-11
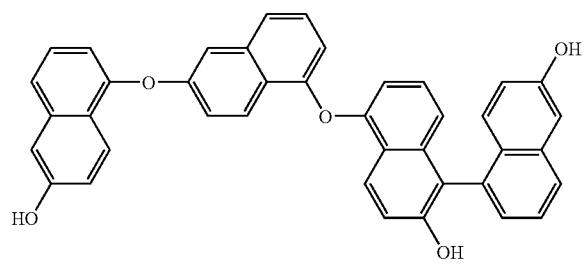
p-12
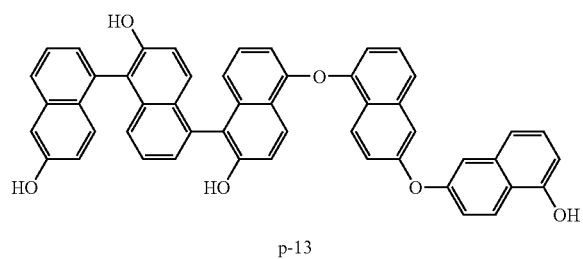
p-13
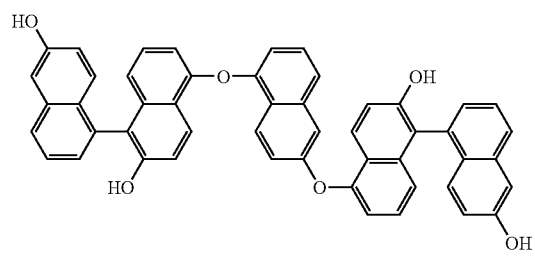
p-14
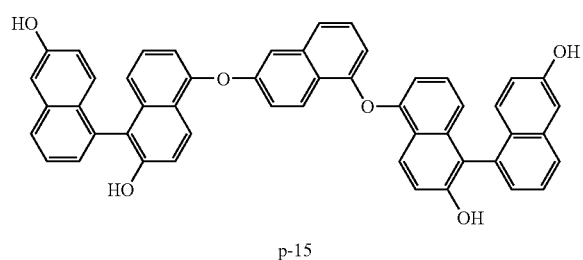
p-15
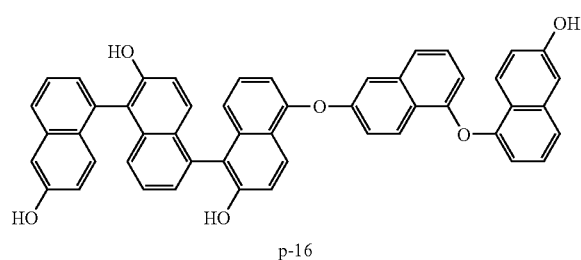
p-16
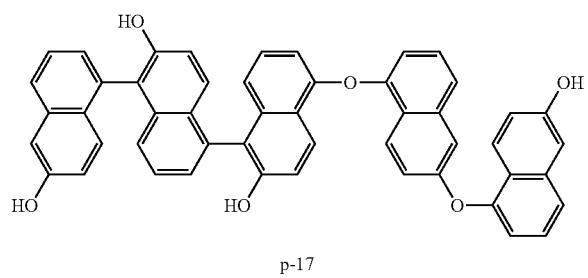
p-17
Next, for example, the phenol resin (B') in which the position of bonding to an oxy group is 2,7-position may be compounds represented by the following structural formulas P-18 to P-25 may be mentioned.

[Chemical Formula 17]
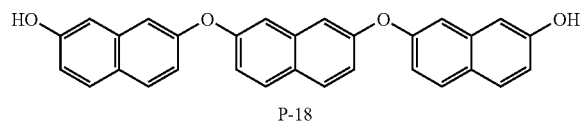
P-18
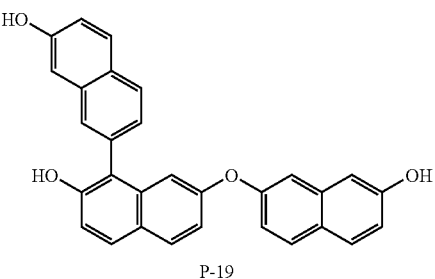
P-19
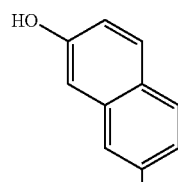
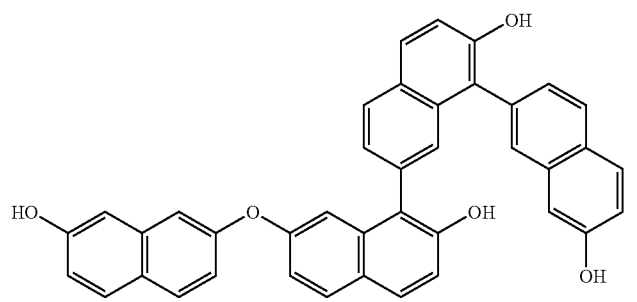
P-20
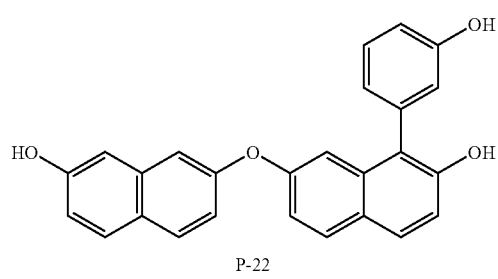
P-21
[Chemical Formula 18]
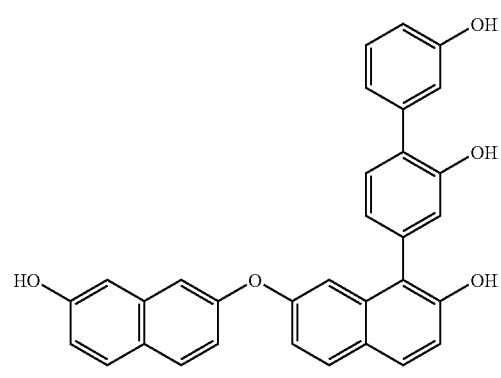
P-23
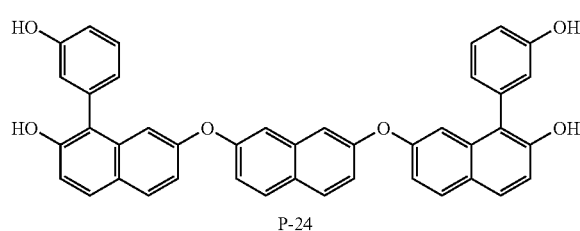
P-22
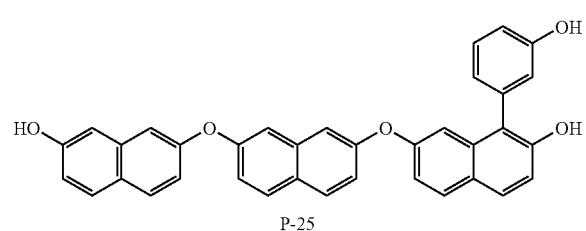
P-24    P-25

The phenol resin (B') may be used individually as each of the compounds, or as a mixture of a plurality of the compounds.

As described above, it is preferable that the phenol resin (B') specifically described above has a structure in which a naphthalene structure is bonded with another naphthalene structure through an oxygen atom since the cured article thereof has much better flame retardancy as well as better heat resistance. Specifically, this phenol resin may be represented by, for example, the following general formula (4).

[Chemical Formula 19]

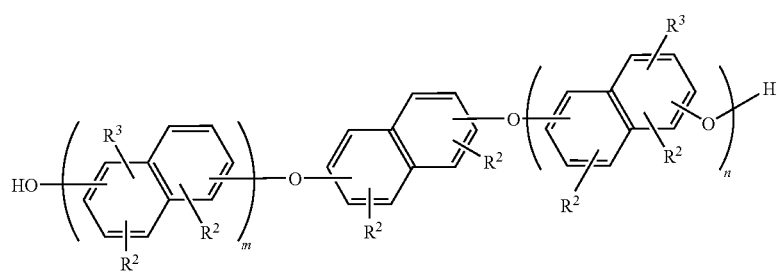

General Formula (4)

In the general formula (4), each $R^2$ represents independently a hydrogen atom or an $C_{1-4}$ alkyl group; n and m each represent an integer of from 0 to 2, and at least one of n and m is 1 or greater; $R^3$ represents a hydrogen atom or the following general formula (4-2), provided that the total number of aromatic nuclei in the general formula (4) is from 2 to 8, and the position of bonding to the naphthalene skeleton in the above general formula (4) may be any of two rings forming the naphthalene ring:

[Chemical Formula 20]

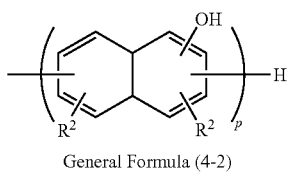

General Formula (4-2)

in which each $R^2$ represents independently a hydrogen atom or an $C_{1-4}$ alkyl group; and p represents an integer of 1 or 2.

In the above general formula (4), $R^2$ is preferably a hydrogen atom, and specific examples thereof may include compounds of the above structural formula P-1 to P-21.

The phenol resin (B') can be obtained, for example, by reacting a multivalent hydroxynaphthalene such as 2-valence to 4-valence or a mixture of multivalent hydroxynaphthalenes such as 2-valence to 4-valence with multivalent hydroxybenzenes such as 2-valence to 3-valence in the presence of an acid catalyst, and then repeatedly extracting a low molecular weight product with an organic solvent. However, it is preferable in the present invention a method of obtaining the phenol resin in which the phenol resin is synthesized by reacting difunctional phenols in the presence of a basic catalyst, that is, synthesized by Process 1 in the method for synthesizing the epoxy resin(A) as described above, from the aspect of excellent productivity.

Since the phenol resin (B') thus-obtained is commonly obtained as a mixture of compounds of each structure as described above, the phenol resin (B') in the present invention may be used as being such a mixture. Moreover, the reaction product contains difunctional phenols which are a raw component. Therefore, the phenol resin (B') of the present invention may be used as a mixture containing this raw component (referred to as "mixture (β)" herein below). The content of the difunctional phenols in the mixture (β) is preferably 5 to 80% as an area ratio in the measurement by GPC, from the aspect of fluidity of the epoxy resin composition.

The phenol resin (B') specifically described above is preferred in which an hydroxyl equivalent in the mixture (β) is in a range of 50 to 350 g/eq. in that the obtained phenol resin has good fluidity, the epoxy resin composition excellent can be obtained by curability and the cured article which is molded is excellent in heat resistance.

In the epoxy resin composition (II) of the present invention, the phenol resin (B') or the mixture (β) may be used alone as a curing agent for the epoxy resin (A'), or may be used in combination with another curing agent as far as the effects of the present invention are not deteriorated. Specifically, another curing agent can be used in a range where the amount of the phenol resin (B') with respect to the total weight of the curing agents is preferably not smaller than 30 weight %, and particularly not smaller than 40 weight %.

Another curing agents which can be combined with the phenol resin (B') are not particularly limited but examples thereof may include amine-based compounds, amide-based compounds, acid anhydride-based compounds, phenol-based compounds other than the phenol resin (B'), multivalent phenol compounds such as aminotriazine-modified phenol resins (multivalent phenol compounds in which phenol nuclei are connected with melamine or benzoguanamine).

Among these, preferable are phenol novolac resins, cresol novolac resins, aromatic hydrocarbon formaldehyde resin-modified phenol resins, phenolaralkyl resins, naphtholaralkyl resins, naphthol novolac resins, naphthol-phenol co-condensed novolac resins, naphthol-cresol co-condensed novolac resins, biphenyl-modified phenol resins, biphenyl-modified naphthol resins, or aminotriazine-modified phenol resins, from the aspect of excellent flame retardancy, and particularly, it is preferable to use compounds such as phenol resins of high aromaticity or a high hydroxyl group equivalent such as the phenolaralkyl resins, the naphtholaralkyl resins, the biphenyl-modified phenol resins, or the biphenyl-modified naphthol resins, or aminotriazine-modified phenol resins containing a nitrogen atom, in that the obtained cured article has excellent flame retardancy and dielectric property.

Next, as the epoxy resin (A') used in the epoxy resin composition (II) of the present invention, examples thereof may include bisphenol A type epoxy resin, bisphenol F type epoxy resin, biphenyl type epoxy resin, tetramethyl biphenyl type epoxy resin, phenol novolac type epoxy resin, cresol novolac type epoxy resin, bisphenol A novolac type epoxy resin, triphenylmethane type epoxy resin, tetraphenylethane type epoxy resin, dicyclopentadiene-phenol addition reaction type epoxy resin, phenolaralkyl type epoxy resin, naphthol-novolac type epoxy resin, naphtholaralkyl type epoxy resin, naphthol-phenol co-condensed novolac type epoxy resin, naphthol-cresol co-condensed novolac type epoxy resin, aromatic hydrocarbon formaldehyde resin-modified phenol resin type epoxy resin, or biphenyl novolac type epoxy resin. These epoxy resins may be used individually or in a mixture of 2 or more thereof.

Among these epoxy resins, the biphenyl type epoxy resin, naphthalene type epoxy resin, phenolaralkyl type epoxy resin, biphenyl novolac type epoxy resin or xanthene type epoxy resin are preferred from the aspect of excellent flame retardancy and dielectric property.

The combined amount of the phenol resin (B') and the curing agent in the epoxy resin composition (II) of the present invention is not particularly limited and is preferably such that the amount of the active group in the curing agent containing the phenol resin (B') is from 0.7 to 1.5 equivalents per 1 equivalent of the total epoxy groups in the epoxy resin (A') since the cured article to be obtained has good mechanical properties.

In addition, optionally, a curing accelerator may be properly combined in the epoxy resin composition (II) of the present invention. Various kinds of curing accelerators may be used, and examples of such a curing accelerator may include phosphor-based compounds, tertiary amines, imidazoles, organic acid metal salts, Lewis acids, or amine complex salts. When used for a semiconductor-encapsulating material, the curing accelerator is preferably a phosphorous-based compound such as triphenyl phosphine, or a tertiary amine such as 1,8-bicyclo-[5.4.0]-undecene (DBU) from the aspect of excellence in curability, heat resistance, electrical properties, reliability in humidity resistance, etc.

In the epoxy resin composition (I) and (II) of the present invention specifically described above, the resin itself has an effect of imparting excellent flame retardancy according to selecting the molecular structure thereof for the epoxy resin or the curing agent, and thus, flame retardancy of the cured article becomes excellent even without combining flame retardants previously used in the art. However, in order to manifest much higher flame retardancy, for example, a non-halogen-based flame retardant which does not substantially contain halogen atoms may be combined in a range where moldability in a encapsulating process or reliability of semiconductor devices in the field of a semiconductor encapsulating material can be kept.

The epoxy resin composition combined with this non-halogen-based flame retardant does not substantially contain halogen atoms, but, for example, may contain halogen atoms of about at most 5000 ppm as trace impurity derived from the epihalohydrin contained in the epoxy resin.

The above non-halogen-based flame retardant may include, for example, a phosphorus-based flame retardant, a nitrogen-based flame retardant, a silicon-based flame retardant, an inorganic flame retardant, an organometallic flame retardant and so on, and the use thereof is not limited, in which these flame retardants may be used individually, or in a plurality of the same type flame retardants or in combination of the different type flame retardants.

As the phosphorus-based flame retardant, either inorganic phosphorus or organic phosphorus compounds may be used. As the inorganic compounds, for example, red-phosphorous, ammonium phosphates such as ammonium phosphate, ammonium phosphate dibasic, ammonium phosphate tribasic, or poly ammonium phosphate, inorganic nitrogen-containing compounds such as amide phosphate may be used.

The red-phosphorous is preferably one that is subject to surface treatment for the purpose of preventing hydrolysis and so on, and as a method of the surface treatment, there may be mentioned, for example, (i) a method in which red phosphorus is coated with a film of an inorganic compound such as magnesium hydroxide, aluminum hydroxide, zinc hydroxide, titanium hydroxide, bismuth hydroxide, bismuth nitrate, or a mixture thereof, (ii) a method in which red phosphorus is coated with a film of a mixture of an inorganic compound such as magnesium hydroxide, aluminum hydroxide, zinc hydroxide, or titanium hydroxide with a thermosetting resin, and (iii) a method in which red phosphorus is coated with a film of an inorganic compound such as magnesium hydroxide, aluminum hydroxide, zinc hydroxide, titanium hydroxide, and then coated with a film of thermosetting resin thereon.

The above organic phosphorus compounds may include, for example, widely used organic phosphorus compounds such as phosphate ester compounds, phosphonic acid compounds, phosphinic acid compounds, phosphine oxide compounds, phosphorane compounds, or organic nitrogen-containing phosphorus compounds, or cyclic organic phosphorus compounds such as 9,10-dihydro-9-oxa-10-phosphaphenathrene-10-oxides, 10-(2,5-dihydrooxyphenyl)-10H-9-oxa-10-phosphaphenathrene-10-oxides, or 10-(2,7-dihydrooxynaphthyl)-10H-9-oxa-10-phosphaphenathrene-10-oxides, or a derivative which is obtained from reacting these with a compound such as epoxy resin or phenol resin.

The amount of the non-halogen-based flame retardant to be combined is suitably selected according to the kind of the phosphorus-based flame retardant, other components of the epoxy resin composition, and required degree of flame retardancy, and for example, when red-phosphorus is used as the non-halogen-based flame retardant, it is preferably in a range of 0.1 to 2.0 parts by weight in 100 parts by weight of the epoxy resin composition (I) or (II) in which all of the epoxy resin, the curing agent, the non-halogen-based flame retardant and other filler or additives are combined, and when the organic phosphorus compounds are used, it is preferably in a range of 0.1 to 10.0 parts by weight, and more preferably in a range of 0.5 to 6.0 parts by weight.

When the above phosphorus-based flame retardant is used, hydrotalcite, magnesium hydroxide, boron compounds, zirconium oxide, black dyes, calcium carbonate, zeolite, zinc molybdate, or active carbon may be combined with the phosphorus-based flame retardant.

As the above nitrogen-based flame retardant, for example, triazine compounds, cyanuric acid compounds, isocyanuric acid compounds, or phenothiazine, and among these, triazine compounds, cyanuric acid compounds, isocyanuric acid compounds are preferable.

As the above triazine compounds, there may be mentioned, for example, melamine, acetoguanamine, benzoguanamine, melon, melam, saccinoguanamine, ethylenemelamine, polymelamine phosphate, or triguanamine, and for example, (i) aminotriazine sulfate compounds such as guanylmelamine sulfate, melem sulfate, or melam sulfate, (ii) co-condensed compounds of phenols such as phenol, cresol, xylenol, butyl phenol, or nonyl phenol, or melamines such as melamine, benzoguanamine, acetoguanamine, or formguanamine, with formaldehyde, (iii) a mixture of the co-condensed compounds of the above (ii) with phenol resins such as phenol formaldehyde condensed compounds, (iv) one that the above (ii) or (iii) is further modified with wood oil or isomerized armani oil.

Specific examples for the above cyanuric acid compounds may include, for example, cyanuric acid, or melamine cyanurate.

The amount of the nitrogen-based flame retardant to be combined is suitably selected according to the kind of the nitrogen-based flame retardant, other components of the epoxy resin composition, and required degree of flame retardancy, and for example, it is preferably in a range of 0.05 to 10 parts by weight, and more preferably in a range of 0.1 to 5 parts by weight, in 100 parts by weight of the epoxy resin composition (I) or (II) in which all of the epoxy resin, the curing agent, the non-halogen-based flame retardant and other filler or additives are combined.

When the above nitrogen-based flame retardant is used, metal hydroxides, or molybdenum compounds may be combined together.

As the above silicon-based flame retardant, silicon atom-containing organic compounds can be used without particular limitation, and, for example, there may be mentioned silicone oil, silicone rubber, or silicone resin.

The amount of the above silicon-based flame retardant to be combined is suitably selected according to the kind of the silicon-based flame retardant, other components of the epoxy resin composition, and required degree of flame retardancy, and for example, it is preferably in a range of 0.05 to 20 parts by weight in 100 parts by weight of the epoxy resin composition (I) or (II) in which all of the epoxy resin, the curing agent, the non-halogen-based flame retardant and other filler or additives are combined. When the above silicon-based flame retardant is used, molybdenum compounds, or alumina may be combined together.

As the above inorganic flame retardant, there may be mentioned, for example, metal hydroxides, metal oxides, metal carbonate compounds, metal powder, boron compounds, or low-melting point glass.

Specific examples for the above metal hydroxides may include, for example, aluminum hydroxide, magnesium hydroxide, dromite, hydrotalcite, calcium hydroxide, barium hydroxide, or zirconium hydroxide.

Specific examples for the above metal oxides may include, for example, zinc molybdate, molybdenum trioxide, zinc tartrate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide or tungsten oxide.

Specific examples for the above metal carbonate compounds may include, for example, zinc carbonate, magnesium carbonate, calcium carbonate, barium carbonate, magnesium carbonate basic, aluminum carbonate, iron carbonate, cobalt carbonate, or titanium carbonate.

Specific examples for the above metal powder may include, for example, aluminum, iron, titanium, manganese, zinc, molybdenum, cobalt, bismuth, chromium, nickel, copper, tungsten, or tin.

Specific examples for the above boron compounds may include, for example, zinc borate, zinc metaborate, barium metaborate, boric acid, or sodium borate. Specific examples for the above low-melting point glass may include, for example, glasses such as Sipri (manufactured by Bauxite-Brown Corp.), $SiO_2$—MgO—$H_2O$, PbO—$B_2O_3$, ZnO—$P_2O_5$—MgO, $P_2O_5$—$B_2O_3$—PbO—MgO, P—Sn—O—F, PbO—$V_2O_5$—$TeO_2$ or $Al_2O_3$—$H_2O$ based hydrated glasses; or boron silicate based glasses.

The amount of the above inorganic flame retardant to be combined is suitably selected according to the kind of the inorganic flame retardant, other components of the epoxy resin composition, and required degree of flame retardancy, and for example, it is preferably in a range of 0.05 to 20 parts by weight and more preferably in a range of 0.5 to 15 parts by weight, in 100 parts by weight of the epoxy resin composition (I) or (II) in which all of the epoxy resin, the curing agent, the non-halogen-based flame retardant and other filler or additives are combined.

Examples for the above organometallic flame retardant may include, for example, ferrocene, acetylacetonate metal complexes, organometallic carbonyl compounds, cobalt organic salt compounds, metal sulfonic acid salts, compounds where metal atom and aromatic compound or heterocyclic compound are bonded in an ionic bonding or coordination bonding.

The amount of the above organometallic flame retardant to be combined is suitably selected according to the kind of the organometallic flame retardant, other components of the epoxy resin composition, and required degree of flame retardancy, and for example, it is preferably in a range of 0.005 to 10 parts by weight in 100 parts by weight of the epoxy resin composition (I) or (II) in which all of the epoxy resin, the curing agent, the non-halogen-based flame retardant and other filler or additives are combined.

The epoxy resin composition (I) or (II) of the present invention may comprise an inorganic filler (C) if necessary. Examples for the above inorganic filler (C) may include, for example, fused silica, crystalline silica, alumina, silicon nitride, or aluminum nitride in the application of a semiconductor encapsulating material, and a conductive filler such as silver powder or copper powder may be mentioned in the application of conductive pastes.

In the present invention, particularly, when the inorganic filler (C) is further contained in a ratio of 70 to 95 weight % in the composition, in addition to the epoxy resin(A) and the curing agent (B) in the epoxy resin composition (I), or when the inorganic filler (C) is further contained in a ratio of 70 to 95 weight % in the composition, in addition to the epoxy resin(A') and the phenol resin (B') in the epoxy resin composition (II), a semiconductor encapsulating material according to the present invention is obtained.

Here, the amount of the inorganic filler (C) to be combined in the semiconductor encapsulating material according to the present invention is in the range of 70 to 95 weight % of the filler per 100 parts by weight of the epoxy resin composition, as described above, but among this range, particularly preferable in 80 to 95 weight % in order to enhancing flame retardancy, humidity resistance or lead-solder crack resistance. When the inorganic filler (C) is contained in the ratio of 80 to 95 weight %, the inorganic filler (C) is preferably fused silica. The fused silica may be used in either crushed form or spherical form, but in order to enhance the mixing ratio of fused silica and prevent an increase in the melt viscosity of the molding material, it is preferable that spherical fused silica be mainly used. Further, in order to enhance the mixing ratio of spherical silica, the inorganic filler is preferably prepared such that the distribution of particle size of spherical silica is properly controlled.

A process for producing the semiconductor encapsulating material of the present invention from the epoxy resin composition (I) or (II) may be mentioned in which each component described above and further the other additives are thoroughly mixed by means of an extruder, kneader, roll or the like until a uniform mixture is obtained, to provide the epoxy resin composition. As for molding a semiconductor package, the semiconductor encapsulating material is molded by using a mold, a transfer molder, an extrusion molder or the like and then heated at a temperature between 50 and 200° C. for 2 to 10 hours, so that a semiconductor package as a molded product can be obtained.

The epoxy resin composition (I) or (II) of the present invention may be used for example, for composition used for underfilling materials, conductive pastes, laminate sheets, or electronic circuit boards, and coating materials such as resin mold materials, adhesives, dielectric interlayer materials for build-up board, or dielectric coatings. Among the above various kinds of uses, the epoxy resin composition (I) or (II) of the present invention may be suitably used for the semiconductor encapsulating material and the underfilling materials, particularly for the semiconductor encapsulating material.

In order to process the epoxy resin composition (I) or (II) of the present invention into a composition for a printed circuit board, the epoxy resin composition may form, for example, a prepreg. It is preferable that the epoxy resin composition is varnished by using an organic solvent to form a prepreg, although no solvent is used according to the viscosity of the epoxy resin composition. As the above organic solvent, polar solvents with a boiling point of at most 160° C. such as methyl ethyl ketone, acetone, dimethyl formamide and the like are preferably used, which may be used individually or as a mixture solvent of 2 or more kinds. The obtained varnish-like composition can be allowed to penetrate in a reinforcing base material of various kinds such as paper, glass fiber, glass nonwoven fiber, aramid paper, aramid fiber, glass mat, or glass roving fiber, and then heated at a temperature according to the used solvent, preferably at 50 to 170° C., to obtain the prepreg as the cured article. A ratio of the resin composition and the reinforcing base material to be used is not particularly limited but it is preferable that the resin proportion in the prepreg is prepared to be commonly 20 to 60 weight %. When a copper-coated laminate sheet is prepared using the epoxy resin composition, the thus-obtained prepreg can be laminated by a common method and properly laminated with a copper thin film, followed by heat-pressing at a temperature between 170 and 250° C. under a pressure of 1 to 10 MPa for 10 minutes to 3 hours, to obtain the copper-coated laminate sheet.

When the epoxy resin composition (I) or (II) of the present invention is used as a conducting paste, there may be mentioned by, for example, a method to be used as a composition for an isotropic conducting film, or a method to be used as a paste resin composition for a circuit connection or an isotropic conducting adhesive which is a liquid phase at room temperature, by dispersing fine conductive particles in the epoxy resin composition.

In order to obtain an interlayer dielectric material for a build-up board from the epoxy resin composition (I) or (II) of the invention, for example, the curable resin composition properly combined with rubber, filler and so on is coated on a circuit-formed wiring board using a spray coating method, a curtain method or the like and then cured. Then, after making a hole such as a through hole part if necessary, the thus-obtained material is treated with a chemical roughening agent and the surface thereof is washed with hot water so as to form a bump, and then subjected to plating a metal such as copper or the like. As a method of plating described above, non-electrolytic plating and electrolytic plating are preferred, and as the roughening agent, there may be mentioned an oxidizing agent, alkali, or organic solvents. These operations are repeated in order according to the purpose, so as to alternatively build up a dielectric resin layer and a conductor layer of the purposed circuit pattern, by which the build-up board can be obtained. Provided that making the through hole part is carried out after forming the dielectric resin layer of the outermost layer. The resin-adhered copper thin film where the resin composition is half-cured on the copper thin film is heat-pressed at a temperature between 170 and 250° C. to form a rough surface, by which the build-up board can be manufacture by omitting the process of plating treatment.

The epoxy resin composition (I) of the present invention may be also used as a resist ink. In this case, there may be mentioned a method in which the epoxy resin (A) is combined with a vinylic monomer having ethylenically unsaturated double bond, and a cationic polymerization catalyst as the curing agent (B), and further added with pigment, talc and filler to form a resist ink composition, and the composition is coated on a printed board by a screen printing method then to obtain a resist ink cured article.

The epoxy resin composition (I) or (II) of the present invention may further comprise various compounding agents such as silane coupling agent, release agent, emulsifier and pigment incorporated therein, according to various kinds of the application described above.

The epoxy resin composition (I) or (II) of the present invention can be cured by common methods according to the purpose or uses so as to obtain the cured article. In this case, it is preferable that a method of obtaining the cured article in which the epoxy resin composition (I) or (II) of the present invention preferably is added with various compounding agents and then properly added with a curing accelerator, and the obtained composition is heated in a temperature range of about 20 to 250° C. A molding method can be employed as a general method for the epoxy resin composition. The thus-obtained cured article forms laminated product, casted product, adhesive layer, coated film, or film.

As specifically described above, the epoxy resin (A) or phenol resin (B') is used in the present invention and thus the cured article manifests excellent flame retardancy and excellent heat resistance even without using a halogen-based flame retardancy, so as to be a material excellent in environmental properties. Since the fluidity is excellent, the inorganic filler (C) can be highly charged, which gives a characteristic being excellent in lead-solder crack resistance particularly in the use of the semiconductor encapsulating material.

EXAMPLES

The present invention will be described in detail with reference to the following-examples and comparative examples, but the invention should not be construed as being limited thereto. All the "parts" and "%" are given based on weight unless otherwise denoted. A melt viscosity at 150° C., a softening point measurement, GPC measurement and MS spectra were measured at the following conditions.
1) A melt viscosity at 150° C.: based on ASTM D4287.
2) A method of measuring a melting point: DSC822e manufactured by Mettler, temperature-raising speed: 3° C./min.
3) GPC:
   Instrument: HLC-8220 GPC, manufactured by Toso Co., Ltd., column: TSK-GEL G2000HXL+G2000HXL+ G3000HXL+G4000HXL, manufactured by Toso Co., Ltd.
   Solvent: tetrahydrofuran
   Flow rate: 1 ml/min
   Detector: $R^1$
4) MS: Double-focusing mass spectrometer AX505H (FD505H), manufactured by Japan Electronics Co., Ltd.

Example 1

Synthesis of Phenol Resin (1)

In a flask equipped with a thermometer, a dropping funnel, a condenser, a fractional distillation column and an agitator was placed 160 g (1.0 mole) of 2,7-dihydroxynaphthalene represented by the following formula and heated at 200° C. with stirring and purging nitrogen gas to be melted:

[Chemical Formula 21]

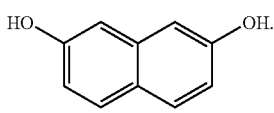

After melting, 23 g (0.2 mol) of 48% potassium hydroxide aqueous solution was added. Then, water derived from the 48% potassium hydroxide aqueous solution and water to be produced was taken out by using the fractional distillation column, and then the reaction was again performed for 5 hours. After the termination of the reaction, methyl isobutyl ketone 1000 g was further added for dissolution, and then transferred to the separatory funnel. Subsequently, the solution was washed with water until the washed water became neutral, and the solvent was removed from the organic layer by heating under a reduced pressure to obtain 150 g of the phenol resin (1). The obtained phenol resin (1) was a brown solid, the hydroxyl equivalent was 120 g/eq and the melting point was 179° C.

The remaining proportion of the un-reacted raw material (2,7-dihydroxynaphthalene) was confirmed to be 64% as an area ratio by the GPC from the GPC chart shown in FIG. 1.

Figure 2:
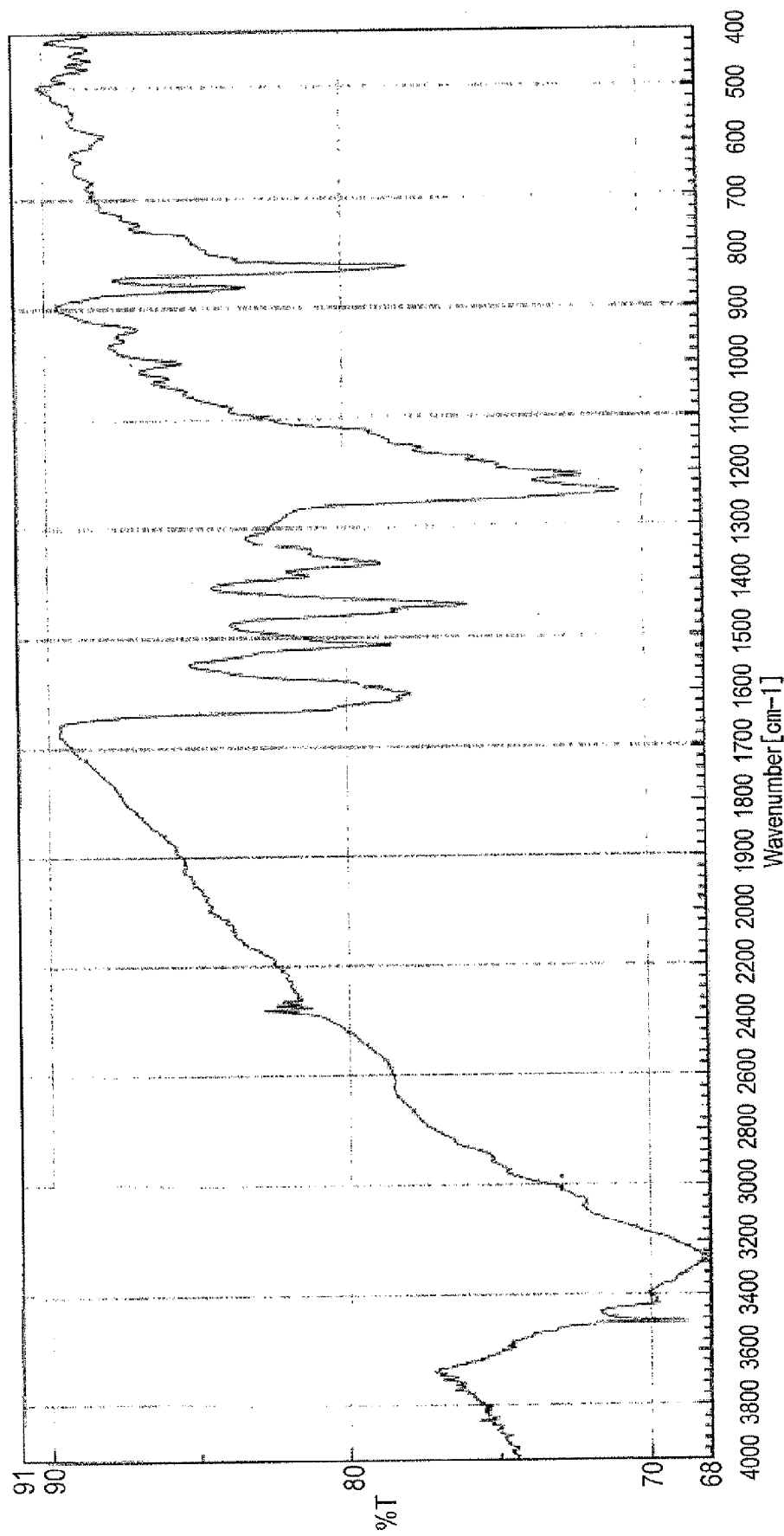
FIG. 2 is a FT-IR chart of the phenol resin obtained in Example 1.

From the results shown in the FT-IR chart shown in FIG. 2, it was confirmed that the absorption (1250 cm$^{-1}$) derived from aromatic ether was newly generated in comparison with the raw material (2,7-dihydroxynaphthalene), and thus it was assumed that dehydrative etherification of the hydroxyl groups occurred.

Figure 3:
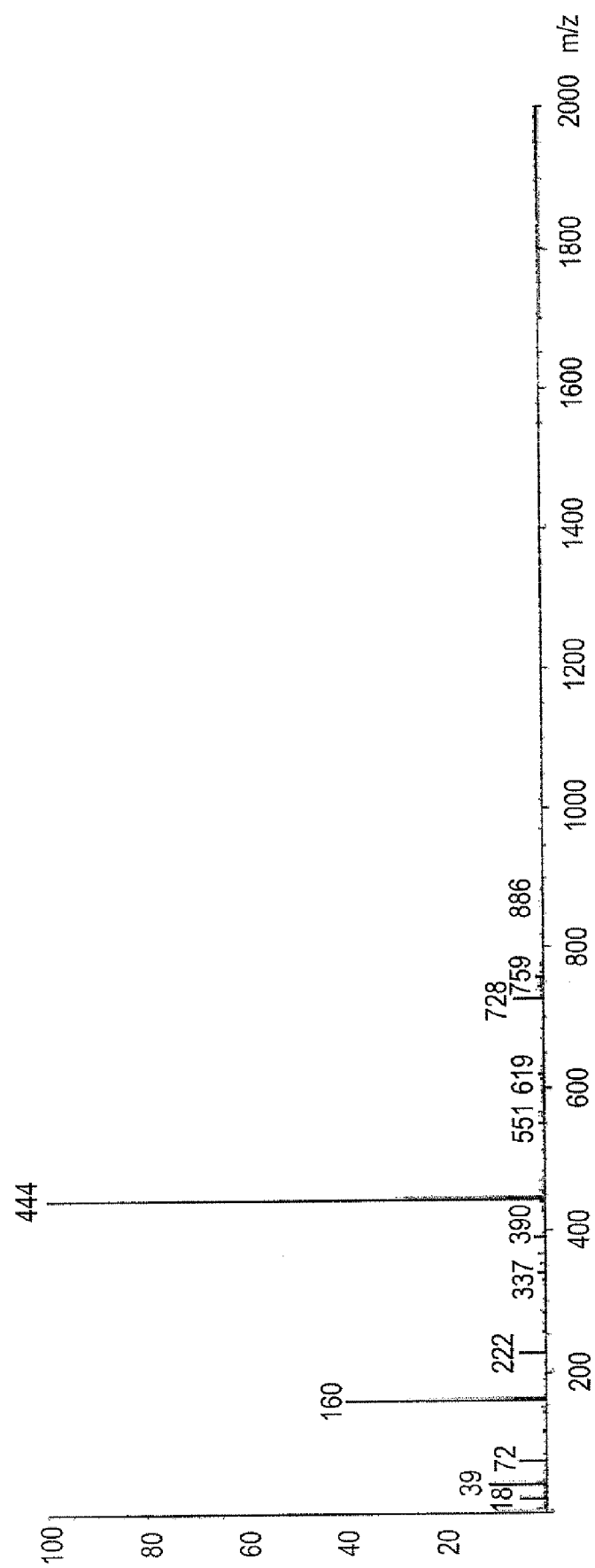
FIG. 3 is the mass spectrum of the phenol resin obtained in Example 1.

From the results shown in the FD-MS chart shown in FIG. 3, there were confirmed 2,7-dihydroxynaphthalene trimeric structure (Mw: 444) synthesized by dehydration of 3 molecules of 2,7-dihydroxynaphthalene, and 2,7-dihydroxynaphthalene pentameric structure (Mw: 728) synthesized by dehydration of 5 molecules of 2,7-dihydroxynaphthalene.

Figure 4:
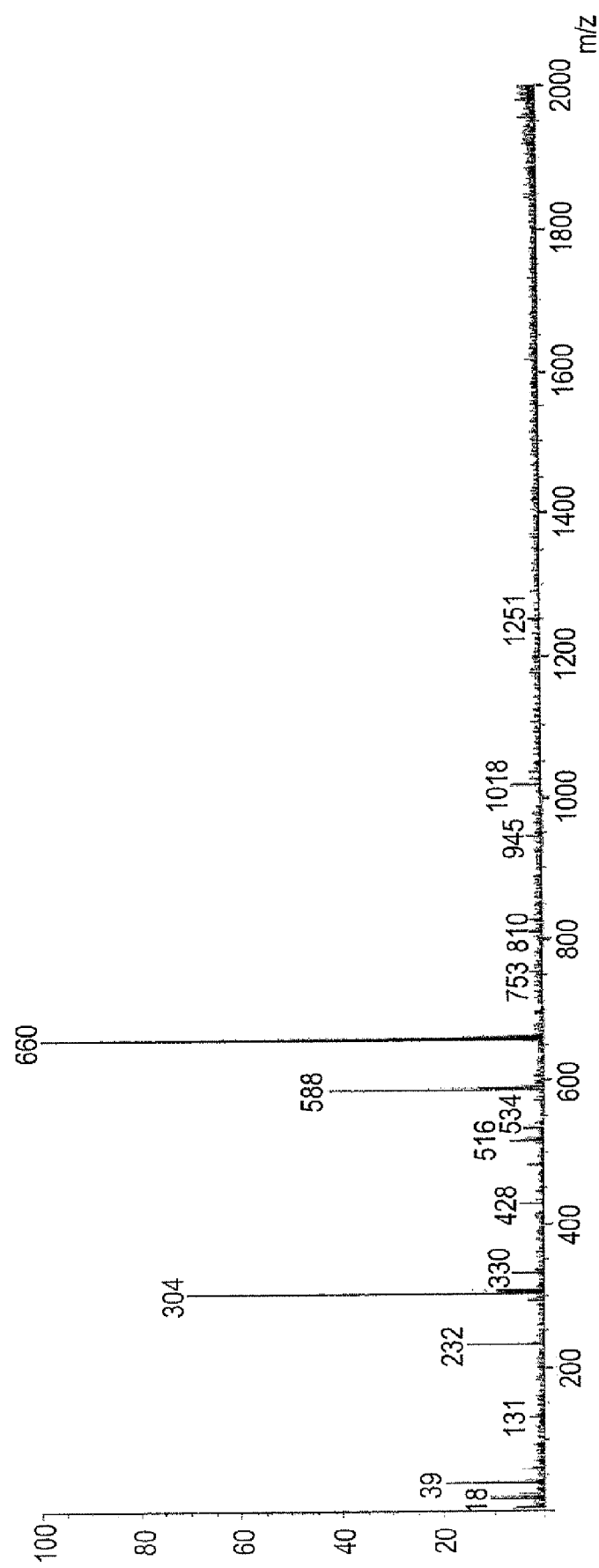
FIG. 4 is the mass spectrum by the trimethylsilylation method of the phenol resin obtained in Example 1.

From the FD-MS by the trimethylsilylation method shown in FIG. 4, there were confirmed the peak ($M^+$=588) which results from adding 2 units of the molecular weight (Mw: 72) of the trimethylsilyl group portion to 2,7-dihydroxynaphthalene trimeric structure (Mw: 444) and the peak ($M^+$=660) which results from adding 3 units of the molecular weight (Mw: 72) of the trimethylsilyl group portion to 2,7-dihydroxynaphthalene trimeric structure (Mw: 444).

The peak ($M^+$=945) was confirmed which results from adding 3 units of the molecular weight (Mw: 72) of the trimethylsilyl group portion to 2,7-dihydroxynaphthalene pentameric structure (Mw: 728) synthesized by dehydration of 5 molecules of 2,7-dihydroxynaphthalene and the peak ($M^+$=1018) which results from adding 4 units of the molecular weight (Mw: 72) of the trimethylsilyl group portion to 2,7-dihydroxynaphthalene pentameric structure (Mw: 728).

From the above, it was interpreted that the phenol resin (1), in which the content of 2,7-dihydroxynaphthalene of the raw material is 64% as the area ratio by GPC with respect to the total resin, contains 2,7-dihydroxynaphthalene trimeric ether compound represented by the following structural formula:

[Chemical Formula 22]

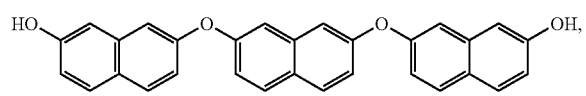

A trimeric compound represented by the following structural formula, which was synthesized by dehydration of 1 molecular nucleus of 2,7-dihydroxynaphthalene with 2,7-dihydroxynaphthalene dimeric ether:

[Chemical Formula 23]

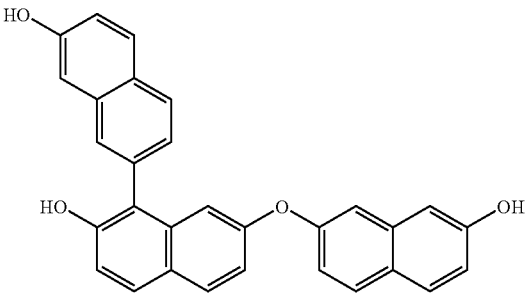

and a pentameric compound represented by the following structural formula:

[Chemical Formula 24]

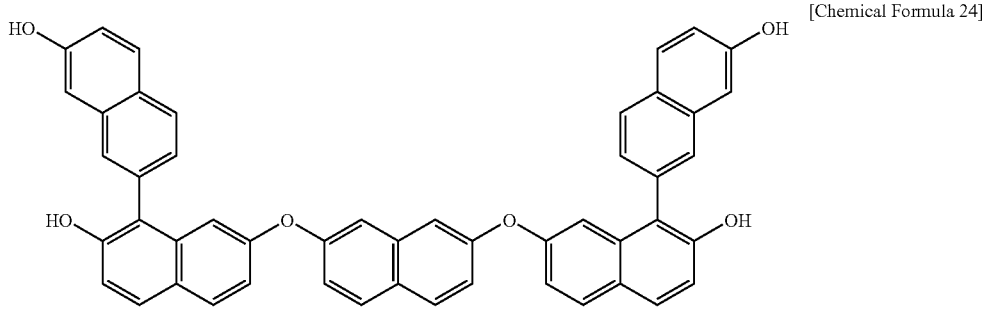 [SMILES: Oc1ccc2ccc(-c3c(O)ccc4ccc(Oc5ccc6ccc(Oc7ccc8ccc(O)c(-c9ccc%10ccc(O)cc%10c9)c8c7)cc6c5)cc34)cc2c1]

which was synthesized by dehydration of 2 molecular nuclei of 2,7-dihydroxynaphthalenes with 2,7-dihydroxynaphthalene trimeric ether.

Example 2

Synthesis of Epoxy Resin (A-1)

In a flask equipped with a thermometer, a dropping funnel, a condenser, and an agitator were placed 120 g of the phenol resin (1) obtained in Example 1, epichlrohydrin 463 g (5.0 mol), n-butanol 139 g and tetraethylbenzyl ammonium chloride 2 g and dissolved. After raising the temperature to 65° C. and then reducing the pressure to the azeotropic pressure, 90 g (1.1 mol) of 49% sodium hydroxide aqueous solution was added dropwise to the solution over 5 hours. Then, the solution was continuously stirred for 0.5 hour at the same condition. During this period, the reaction was carried out while the portion distilled out by azeotropic boiling was separated by a Dean-Stark trap, then, the aqueous layer was removed and the organic layer was recycled into the reaction system. Then, the un-reacted epichlrohydrian was distilled off by evaporation under a reduced pressure. Next, methyl isobutyl ketone 432 g and n-butanol 130 g was further added to the crude epoxy resin thus-obtained and dissolved. Again, 10 g of 10% sodium hydroxide aqueous solution was added to this solution and reacted at 80° C. for 2 hours, and the solution was washed 3 times with 150 g of water until pH of the washed water became neutral. Then, after the system inside was dehydrated by azeotropic boiling and subject to precision filtration, the solvent was distilled off by evaporation under a reduced pressure, to obtain 170 g of the epoxy resin (referred to as "epoxy resin (A-1)" below). The obtained epoxy resin (A-1) had a melt viscosity at 150° C. of 0.5 dPa·s and epoxy equivalent of 187 g/eq.

Example 3

Synthesis of Phenol Resin (2)

Figure 5:
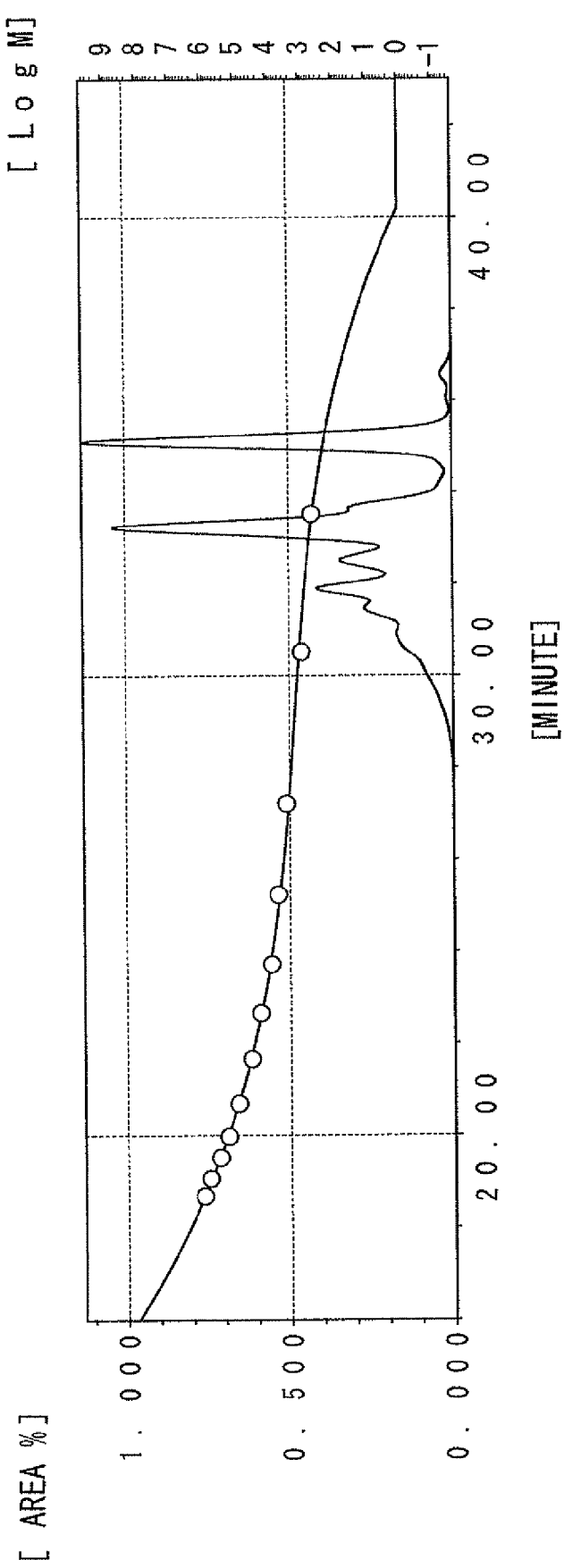
FIG. 5 is a GPC chart of the modified dihydroxynaphthalene compound obtained in Example 3.

147 g of the phenol resin (2) was obtained in the same manner as in Example 1, except that the 2,7-dihydroxynaphthalene 160 g in Example 1 was changed to 1,6-dihydroxynaphthalene 160 g. The obtained phenol resin (2) was a brown solid and had hydroxyl group equivalent of 135 g/eq and melting point of 137° C. From the GPC chart in FIG. 5, the remaining proportion of the un-reacted raw material (1,6-dihydroxynaphthalene) was confirmed to be 24% as an area ratio by GPC.

Example 4

Synthesis of Epoxy Resin (A-2)

185 g of the epoxy resin of the present invention (abbreviated as "epoxy resin (A-2)" below) was obtained in the same manner as in Example 2, except that 135 g of the phenol resin (2) obtained in Example 3 was used instead of the phenol resin (1) 120 g used as the raw material in Example 2. The obtained epoxy resin had a melt viscosity at 150° C. of 0.3 dPa·s and epoxy equivalent of 204 g/eq.

Example 5

Synthesis of Phenol Resin (3)

Figure 6:
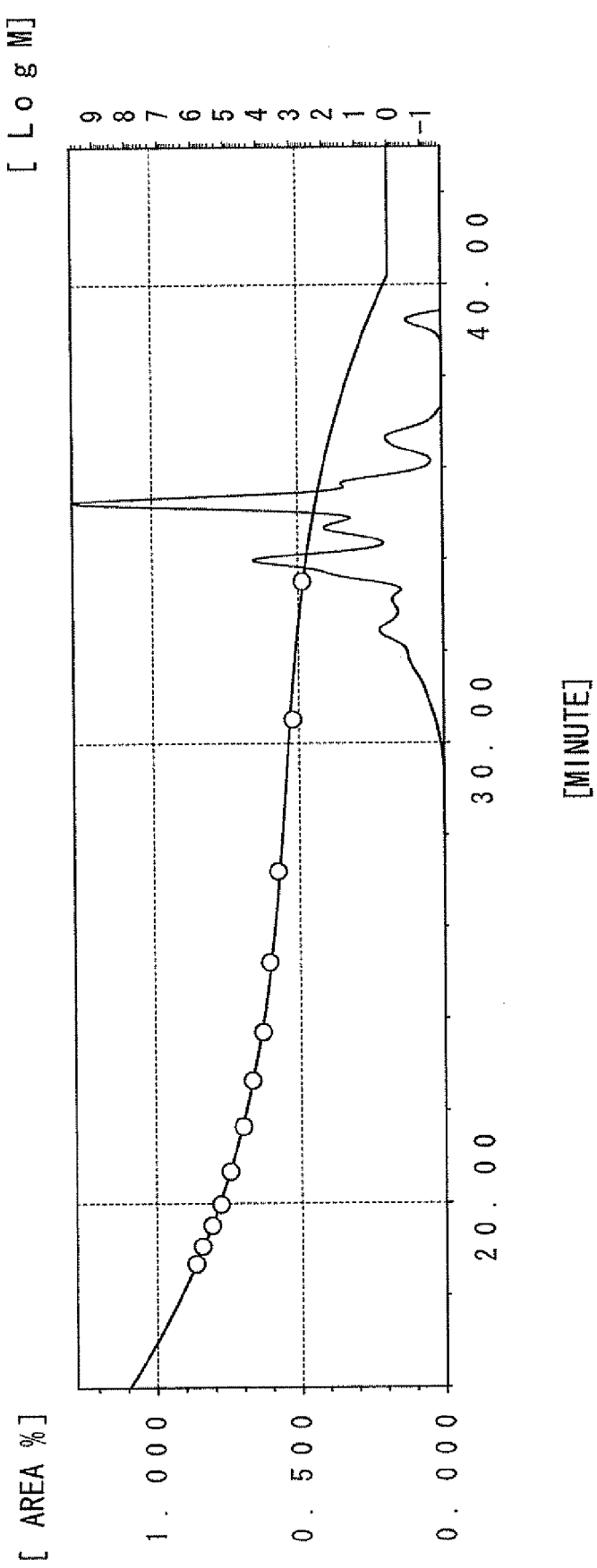
FIG. 6 is a GPC chart of the phenol resin obtained in Example 5.

125 g of the phenol resin (3) was obtained in the same manner as in Example 1, except that the 2,7-dihydroxynaphthalene 160 g in Example 1 was changed to a mixture of 2,7-dihydroxynaphthalene 80 g (0.5 mol) and 1,3-dihydroxy benzene 55 g (0.5 mol). The obtained phenol resin (3) was a brown solid and had a hydroxyl group equivalent of 101 g/eq and a melting point of 136° C. From the GPC chart in FIG. 6, the remaining proportion of the un-reacted raw material (the sum of 2,7-dihydroxynaphthalene and 1,3-dihydroxy benzene) was confirmed to be 36% as an area ratio by GPC.

Example 6

Synthesis of Epoxy Resin (A-3)

152 g of the epoxy resin of the present invention (abbreviated as "epoxy resin (A-3)" below) was obtained in the same manner as in Example 2, except that 101 g of the phenol resin (3) obtained in Example 5 was used instead of the phenol resin (1) 120 g used as the raw material in Example 2. The obtained epoxy resin had a melt viscosity at 150° C. of 0.3 dPa·s and epoxy equivalent of 170 g/eq.

Comparative Example 1

Synthesis of Phenol Resin (1')

Figure 7:
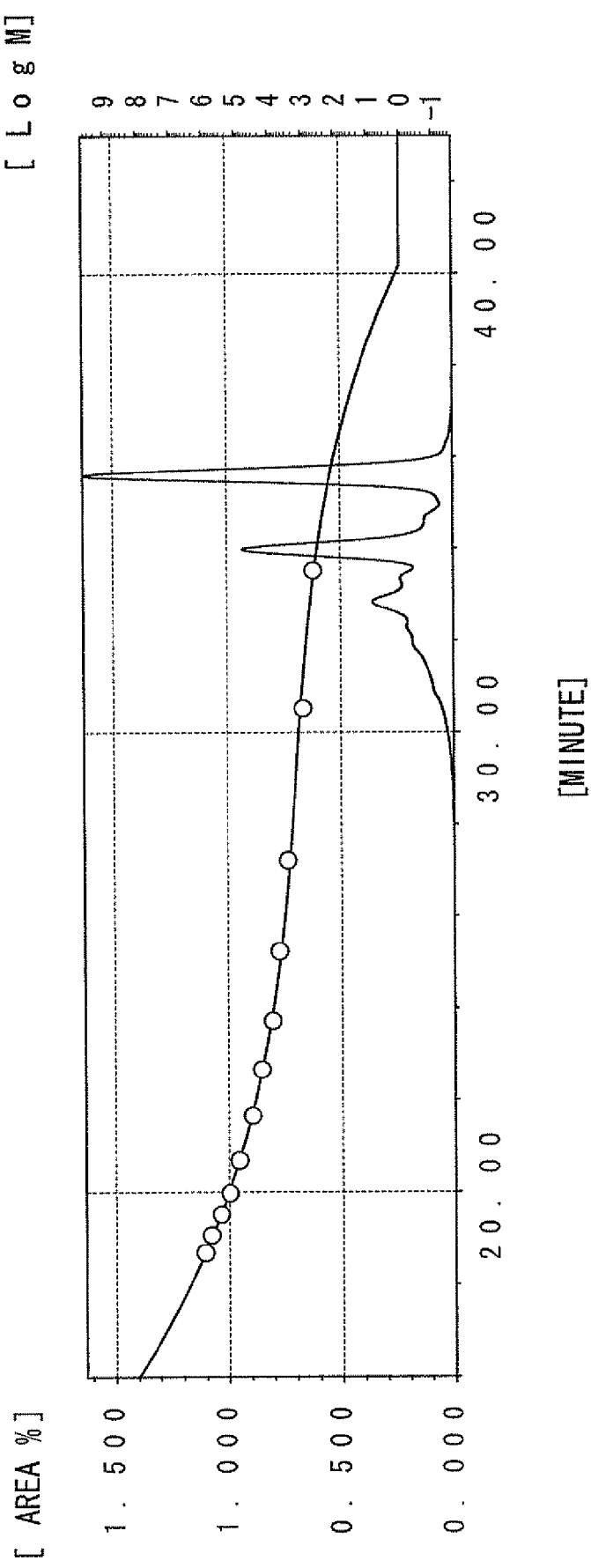
FIG. 7 is a GPC chart of the phenol resin obtained in Comparative Example 1.

100 g of the phenol resin (1') was obtained in the same manner as in Example 1, except that the 2,7-dihydroxynaphthalene 160 g in Example 1 was changed to 1,3-dihydroxy benzene 110 g (1.0 mol). The obtained phenol resin (1') was brown solid and had a hydroxyl group equivalent of 85 g/eq and a melting point of 122° C. From the GPC chart in FIG. 7, the remaining proportion of the un-reacted raw material (1,3-dihydroxy benzene) was confirmed to be 36% as an area ratio by GPC.

Comparative Example 2

Synthesis of Epoxy Resin (A'-1)

137 g of the epoxy resin (abbreviated as "epoxy resin (A'-1)" below) was obtained in the same manner as in Example 2, except that 85 g of the phenol resin (1') obtained in Comparative Example 1 was used instead of the phenol resin (1) 120 g used as the raw material in Example 2. The obtained epoxy resin has a melt viscosity at 150° C. of 0.1 dPa·s and an epoxy equivalent of 152 g/eq.

Comparative Example 3

Synthesis of Phenol Resin (2')

Figure 8:
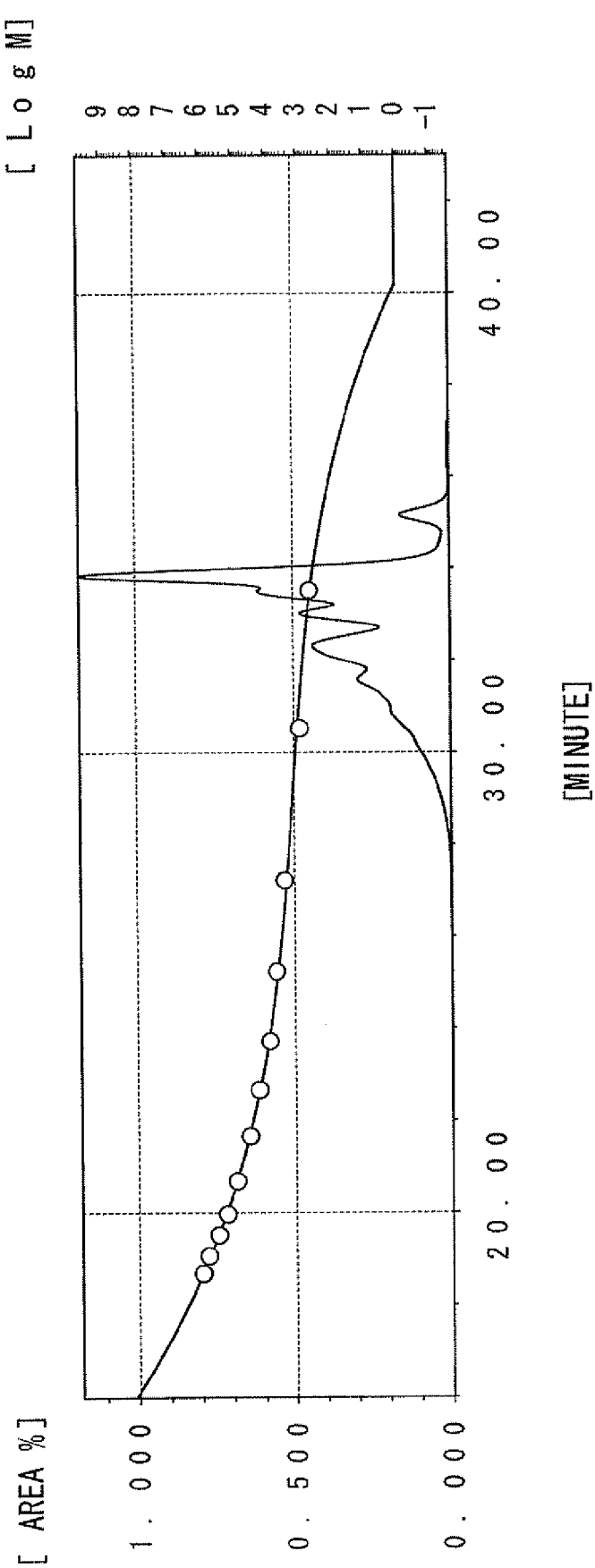
FIG. 8 is a GPC chart of the phenol resin obtained in Comparative Example 3.

145 g of the phenol resin (2') was obtained in the same manner as in Example 1, except that the 23 g of 48% potassium hydroxide aqueous solution (0.2 mol) in Example 1 was changed to 2 g of a para-toluenesulfonic acid•monohydrate. The obtained phenol resin (2') was a brown solid and had a hydroxyl group equivalent of 183 g/eq and a decomposing point of 250° C. From the GPC chart in FIG. 8, the remaining proportion of the un-reacted raw material (2,7-dihydroxynaphthalene) was confirmed as being 4% as an area ratio by GPC.

Figure 9:
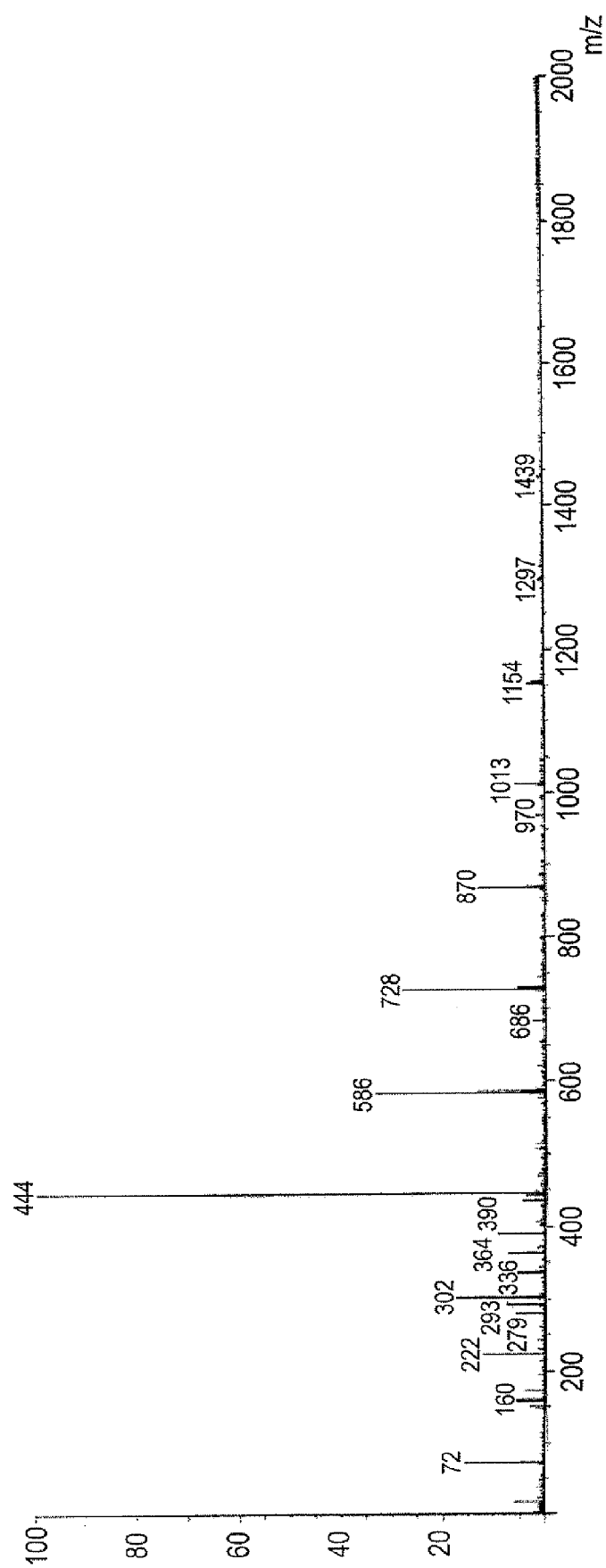
FIG. 9 is the mass spectrum of the phenol resin obtained in Comparative Example 3.

From the results of the FD-MS chart in FIG. 9, there were confirmed 2,7-dihydroxynaphthalene dimeric structure (Mw: 302) synthesized by dehydration of 2 molecules of 2,7-dihydroxynaphthalene, 2,7-dihydroxynaphthalene trimeric structure (Mw:444) synthesized by dehydration of 3 molecules of 2,7-dihydroxynaphthalene, 2,7-dihydroxynaphthalene tetrameric structure (Mw:586) synthesized by dehydration of 4 molecules thereof, 2,7-dihydroxynaphthalene pentameric structure (Mw:728)) synthesized by dehydration of 5 molecules thereof, 2,7-dihydroxynaphthalene hexameric structure (Mw:870) synthesized by dehydration of 6 molecules thereof, 2,7-dihydroxynaphthalene heptameric structure (Mw:1013) by dehydration of 7 molecules thereof, 2,7-dihydroxynaphthalene octameric structure (Mw:1154) by dehydration of 8 molecules thereof, 2,7-dihydroxynaphthalene nonameric structure (Mw:1297) 2,7-dihydroxynaphthalene by dehydration of 9 molecules thereof, decameric structure (Mw:1439) by dehydration of 10 molecules thereof.

Comparative Example 4

Synthesis of Epoxy Resin (A'-2)

167 g of the epoxy resin (A'-2) was obtained in the same manner as in Example 2, except that 183 g of the phenol resin (2') obtained in Comparative Example 3 was used instead of the phenol resin (1) 120 g used as the raw material in Example 2 (after the product was taken out, deposition of a large amount of insoluble matters were observed on the wall inside of the flask). The obtained epoxy resin had a melt viscosity at 150° C. of at least 400 dPa·s and epoxy equivalent of 303 g/eq.

Example 7

Synthesis of Phenol Resin (3')

Figure 10:
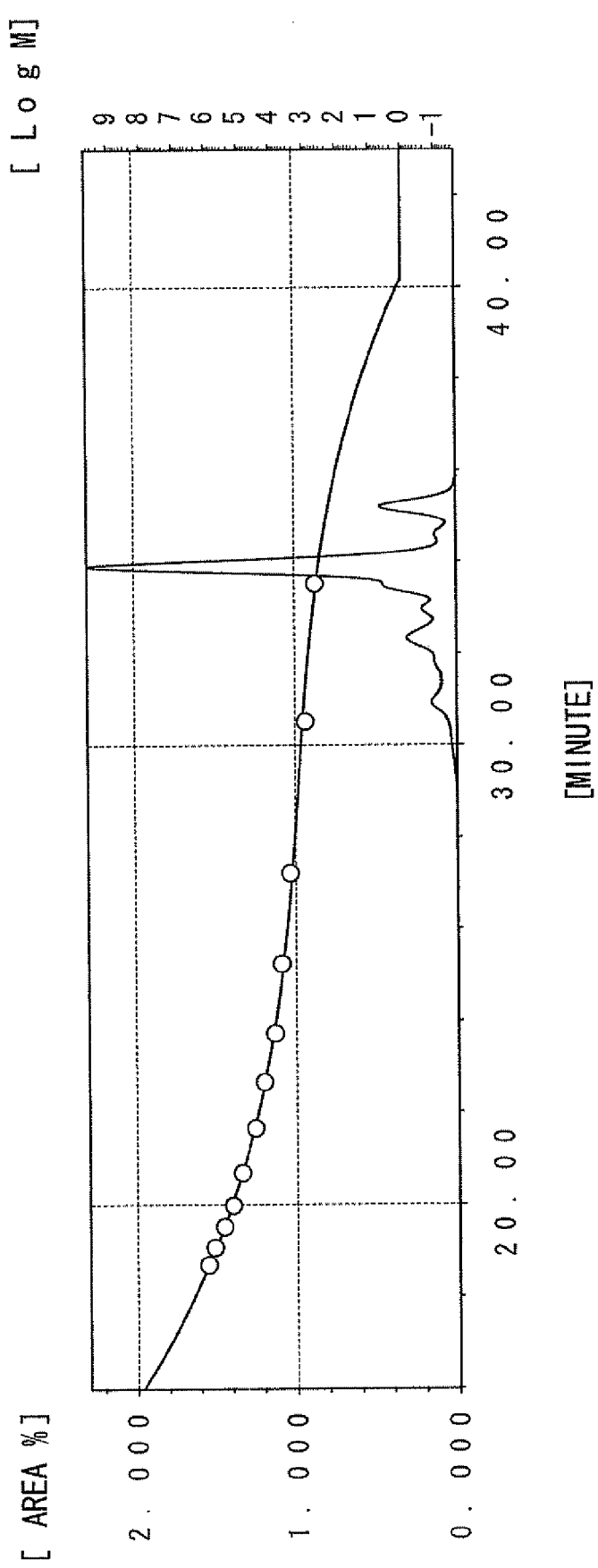
FIG. 10 is a GPC chart of the phenol resin obtained in Example 7.

Methyl isobutyl ketone 300 g was added to 100 g of the phenol resin (2') obtained in Comparative Example 3 and homogeneously dissolved. Then, with purging nitrogen gas, a temperature of the solution was raised to 80° C., followed by adding 1% sodium hydroxide aqueous solution of 200 g to extract a low molecular weight component (this operation was repeated 4 times). After that, 36% hydrochloric acid aqueous solution was added until pH of the extracted 1% sodium hydroxide aqueous solution became 1, and then the low molecular weight component of the precipitated phenol resin was again extracted 3 times with methyl isobutyl ketone 100 g (this operation was repeated 3 times). The extracted methyl isobutyl ketone solution was repeatedly washed with 300 g of water until it showed pH=7. Then, the methyl isobutyl ketone was distilled off to obtain the phenol resin (3') of 30 g. The obtained phenol resin (3') was a brown solid and had hydroxyl group equivalent of 160 g/eq and melting point of 192° C. From the GPC chart in FIG. 10, the remaining proportion of the un-reacted raw material (2,7-dihydroxynaphthalene) was confirmed to be 10% as an area ratio by GPC.

Figure 11:
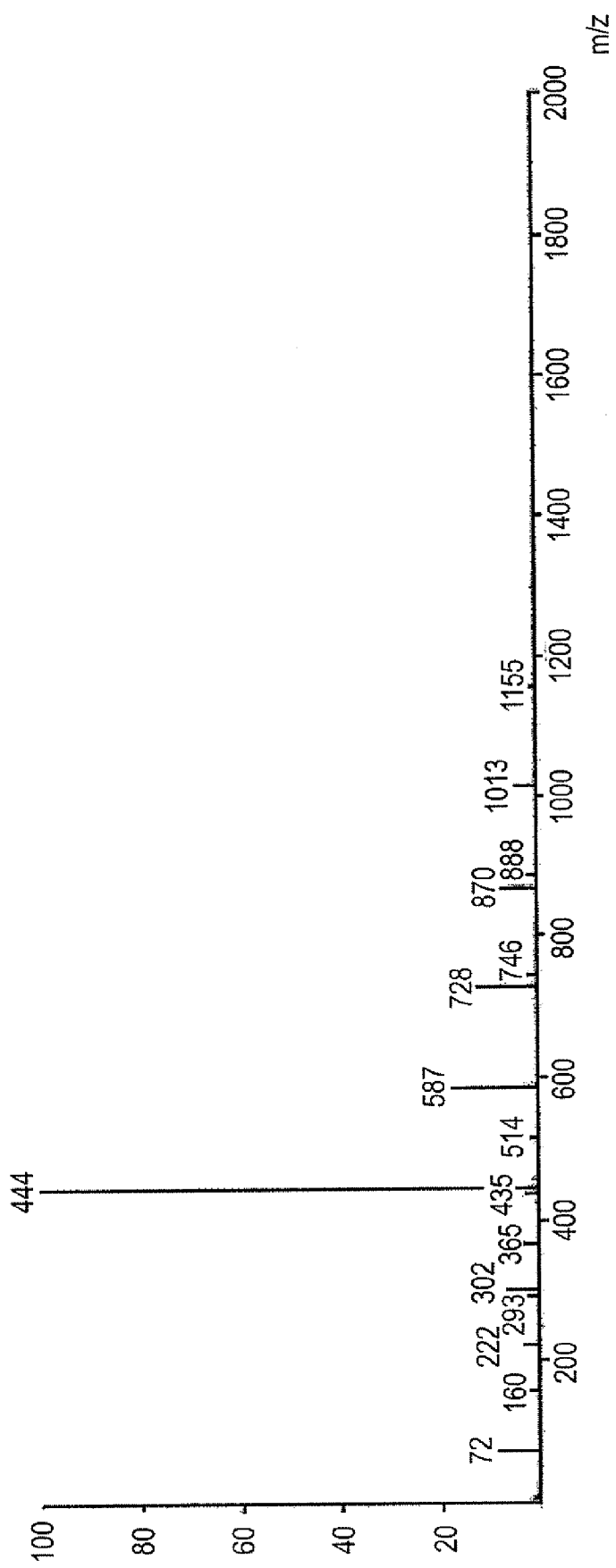
FIG. 11 is the mass spectrum of the phenol resin obtained in Example 7.

From the results of the FD-MS chart in FIG. 11, there were confirmed 2,7-dihydroxynaphthalene dimeric structure (Mw: 302) synthesized by dehydration of 2 molecules of 2,7-dihydroxynaphthalene, 2,7-dihydroxynaphthalene trimeric structure (Mw:444) synthesized by dehydration of 3 molecules of 2,7-dihydroxynaphthalene, 2,7-dihydroxynaphthalene tetrameric structure (Mw:586) synthesized by dehydration of 4 molecules thereof, 2,7-dihydroxynaphthalene pentameric structure (Mw:728) synthesized by dehydration of 5 molecules thereof, 2,7-dihydroxynaphthalene hexameric structure (Mw:870) synthesized by dehydration of 6 molecules thereof, 2,7-dihydroxynaphthalene heptameric structure (Mw:1013) by dehydration of 7 molecules thereof, and 2,7-dihydroxynaphthalene octameric structure (Mw:1155) by dehydration of 8 molecules thereof.

Example 8

Synthesis of Epoxy Resin (A-4)

210 g of the epoxy resin (A-4) was obtained in the same manner as in Example 2, except that 160 g of the phenol resin (3') obtained in Example 7 was used instead of the phenol resin (1) 120 g used as the raw material in Example 2. The obtained epoxy resin has a softening point of 55° C., a melt viscosity at 150° C. of 0.7 dPa·s and epoxy equivalent of 229 g/eq.

Examples 9 to 15 and Comparative Examples 5 to 10

Using A-1 to A-4, A'-1, A'-2 obtained in Examples, NC-3000 (biphenylaralkyl type epoxy resin, epoxy equivalent: 277 g/eq) manufactured by Nippon Kayaku Co., Ltd. and N-665-EXP (cresol novolac type epoxy resin, epoxy equivalent: 203 g/eq) manufactured by Dainippon Ink and Chemicals, Inc., as the epoxy resin, Mirex XLC-LL (phenolaralkyl resin, hydroxyl group equivalent: 176 g/eq) manufactured by Mitsui Chemicals, Inc. as a curing agent phenol resin, TD-2131 (phenol novolac resin, hydroxyl group equivalent: 104 g/eq) manufactured by Dainippon Ink and Chemicals, Inc. and the phenol resin (1) obtained in Example 1, these were combined with triphenylphosphine (TPP) as a curing accelerator, a condensed phosphoric acid ester (PX-200, manufactured by Daihachi. Chemical Industry Co., Ltd.) as a flame retardant, magnesium hydroxide (Z-10 manufactured by Air Water Co., Ltd.), a spheral fused silica (S-COL, manufactured by Micron Co., Ltd.) as an inorganic filler, γ-glycidoxy triethoxysilane (KBM-403, manufactured by Shin Etsu Chemical Co., Ltd.) as a silane coupling agent, carnauba wax (PEARL WAX No. 1-P, manufactured by Cerarica Noda Co., Ltd.), and carbon black, according to the formulation set forth in Tables 1 and 2, and subject to melt-kneading using 2 rolls at 100° C. for 10 minutes, to obtain the purposed composition. For the obtained composition, the gel time was measured by the following method to test the curability. Further, after this composition was press-molded at 180° C. for 10 minutes and further cured at 180° C. for 5 hours, a test specimen of 1.6 mm thickness was prepared from the cured article thus-obtained according to the UL-94 test method and properties of the cured article were confirmed by the following method.

Gel time: The epoxy resin 0.15 g was loaded on a cure plate (manufactured by Thermo Electric Co., Ltd.) heated to 175° C. and the system observation started by using a stopwatch. The sample was uniformly stirred at the end of the rod, and the stopwatch stopped when the sample was broken in a form of thread, which was left on the plate. The time consumed until this sample was broken to be left on the plate was set as the gel time.

Flame retardance: The 5 specimens of 1.6 mm thickness prepared by the UL-94 test method were subject to a combustion test.

Glass transition temperature: it was measured using a viscoelasticity measuring instrument (RSAII manufactured by Rheometrics Co., Ltd., double Cantilever method: frequency of 1 Hz, temperature-raising velocity of 3° C./min).

The results from the measurements are shown in Table 1 and 2.

[TABLE 1]

TABLE 1

The table of the formulation (weight parts) of the epoxy resin composition and the evaluation results

|  |  | Examples | | | | | | |
|---|---|---|---|---|---|---|---|---|
|  |  | 9 | 10 | 11 | 12 | 13 | 14 | 15 |
| Epoxy Resin | A-1 | 69 |  |  |  | 82 | 86 | 86 |
|  | A-2 |  | 72 |  |  |  |  |  |
|  | A-3 |  |  | 66 |  |  |  |  |
|  | A-4 |  |  |  | 76 |  |  |  |
| Curing agent | XLC-LL | 65 | 62 | 68 | 58 |  |  |  |
|  | TD-2131 |  |  |  |  |  | 48 | 48 |
|  | Phenol resin (1) |  |  |  |  | 52 |  |  |
| Condensed phosphoric acid ester |  |  |  |  |  |  | 30 |  |
| Magnesium hydroxide |  |  |  |  |  |  |  | 20 |
| TPP |  | 3 | 3 | 3 | 3 | 3 | 3 | 3 |
| Fused silica |  | 850 | 850 | 850 | 850 | 850 | 850 | 850 |
| Coupling agent |  | 5 | 5 | 5 | 5 | 5 | 5 | 5 |
| Carnauba wax |  | 5 | 5 | 5 | 5 | 5 | 5 | 5 |
| Carbon black |  | 3 | 3 | 3 | 3 | 3 | 3 | 3 |
| Combustion test class |  | V-0 | V-0 | V-0 | V-0 | V-0 | V-0 | V-0 |
| 1* |  | 3 | 4 | 4 | 4 | 2 | 9 | 8 |
| 2* |  | 18 | 24 | 35 | 20 | 10 | 42 | 38 |
| Gel time (sec) |  | 19 | 24 | 20 | 20 | 32 | 27 | 28 |
| Glass transition temperature |  | 160 | 153 | 155 | 170 | 190 | 166 | 162 |

Notes of Table 1:
*1: the maximum combustion time in contact with a flame at one time (sec),
*2: the total combustion time of the 5 test specimens (sec),
Self-extinguish: although flame retardancy (ΣF ≤ 250 sec and F$_{max}$ ≤ 30 sec) required in V-1 was not satisfied, the combustion flame is extinguished before reaching the position of the fixing clamp.

TABLE 2

Table 2. The table of the formulation (weight parts) of the epoxy resin composition and the evaluation results

|  |  | Comparative Examples | | | | | |
|---|---|---|---|---|---|---|---|
|  |  | 5 | 6 | 7 | 8 | 9 | 10 |
| Epoxy Resin | A'-1 | 80 |  |  |  |  |  |
|  | NC-3000 |  | 82 |  |  | 97 | 97 |
|  | N-665E XP |  |  | 72 |  |  |  |
|  | A'-2 |  |  |  | 80 |  |  |
| Curing agent | XLC-LL 176 |  | 52 | 62 |  |  | 54 |
|  | TD-2131 104 | 54 |  |  | 37 | 37 |  |
|  | Phenol resin (1) |  |  |  |  |  |  |
| Condensed phosphoric acid ester |  |  |  |  |  | 30 |  |
| Magnesium hydroxide |  |  |  |  | 20 |  |  |
| TPP |  | 3 | 3 | 3 | 3 | 3 | 3 |
| Fused silica |  | 850 | 850 | 850 | 850 | 850 | 850 |
| Coupling agent |  | 5 | 5 | 5 | 5 | 5 | 5 |
| Carnauba wax |  | 5 | 5 | 5 | 5 | 5 | 5 |
| Carbon black |  | 3 | 3 | 3 | 3 | 3 | 3 |
| Combustion test class |  | Self-extinguish | V-1 | combustion | Self-extinguish | Self-extinguish | The formulation could not be obtained due to too high viscosity. |
| 1* |  | 35 | 20 | 56 | 32 | 35 |  |
| 2* |  | 151 | 93 | 238 | 138 | 160 |  |
| Gel time (sec) |  | 30 | 27 | 22 | 35 | 38 |  |
| Glass transition temperature |  | 149 | 130 | 150 | 135 | 134 |  |

INDUSTRIAL APPLICABILITY

According to the present invention, an epoxy resin composition which is excellent in fluidity as well as capable of imparting excellent flame retardancy and heat resistance in a cured article thereof, a semiconductor-encapsulating material, a novel epoxy resin, a novel phenol resin, and a cured article of the epoxy resin composition, excellent both in flame retardancy and in heat resistance, can be provided.

The invention claimed is:

1. An epoxy resin composition, comprising
   an epoxy resin (A) having a structure in which a naphthalene structure is bonded with another naphthalene structure via an ether bond at the 2-postion or the 7-position of said another naphthalene structure, the total number of aromatic nuclei forming said naphthalene structure and said another naphthalene structure per molecule is from 2 to 8, and at least one of said aromatic nuclei has a (meth)glycidyloxy group as a substituent at the 2-postion or the 7-positions of said aromatic nucler; and
   a curing agent (B),
   wherein said naphthalene structure is bonded to oxy groups only at the 2-position and the 7-position of said naphthalene structure.

2. The epoxy resin composition according to claim 1, wherein the epoxy resin (A) has a structure in which another aromatic ring is covalently bonded to the aromatic rings which form said naphthalene structure or said another naphthalene structure.

3. The epoxy resin composition according to claim 1, wherein the epoxy resin (A) has a structure represented by the following general formula (5):

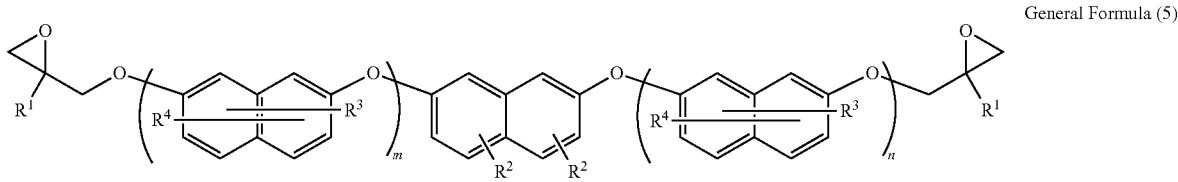

General Formula (5)

wherein, $R^1$ represents a hydrogen atom or a methyl group;
each $R^2$ or $R^4$ represents independently a hydrogen atom or a $C_{1-4}$ alkyl group;
n and m each represent an integer of from 0 to 2, and at least one of n and m is 1 or greater;
$R^3$ represents a hydrogen atom or an aromatic hydrocarbon group containing an epoxy group represented by the following general formula (1-2):

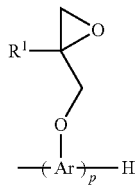

General Formula (1-2)

wherein, $R^1$ represents a hydrogen atom or a methyl group; each Ar represents independently a naphthylene group, a phenylene group, or a naphthylene group or a phenylene group having a $C_{1-4}$ alkyl group or a phenyl group as a substituent; p represents an integer of 1 or 2;
provided that the total number of the aromatic nuclei in the general formula (5) is from 2 to 8; and
in the general formula (5), a position of bonding to the naphthalene structure part may be any of two benzene rings forming the naphthalene structure part.

4. A semiconductor-encapsulating material, comprising the epoxy resin composition according to any one of claims 1 to 3,
wherein the epoxy resin composition further comprises an inorganic filler (C) in a ratio of 70 to 95 weight% in the composition in addition to said epoxy resin (A) and said curing agent (B).

5. An epoxy resin composition, comprising
a phenol resin (B') having a structure in which a naphthalene structure is bonded with another naphthalene structure via an ether bond at 2-position or the 7-position of said another naphthalene structure, the total number of aromatic nuclei forming said naphthalene structure and said another naphthalene structure per molecule is from 2 to 8, and at least one of the aromatic nuclei has a phenol hydroxyl group as a substituent at the 2-position or the 7-position of said aromatic nuclei; and
an epoxy resin (A'),
wherein said naphthalene structure is bonded to oxy groups only at the 2-position and the 7position of said naphthalene structure.

6. A semiconductor-encapsulating material, comprising the epoxy resin composition according to claim 5,
wherein the epoxy resin composition further comprises an inorganic filler (C) in a ratio of 70 to 95 weight% in the composition in addition to said phenol resin (B') and said epoxy resin (A').

7. A cured article, which is formed by curing the epoxy resin composition according to any one of claims 1 to 5.

8. The epoxy resin composition according to claim 5, wherein the phenol resin (B') has a structure in which other aromatic ring is covalently bonded to an aromatic ring in polyaryleneoxy structure.

9. A semiconductor-encapsulating material, comprising the epoxy resin composition according to any one of claim 8,
wherein the epoxy resin composition further comprises an inorganic filler (C) in a ratio of 70 to 95 weight% in the composition in addition to said phenol resin (B') and said epoxy resin (A').

10. A cured article, which is formed by curing the epoxy resin composition according to any one of claim 8.

11. The epoxy resin composition according to claim 5, wherein the phenol resin (B') has a structure represented by the following general formula (6):

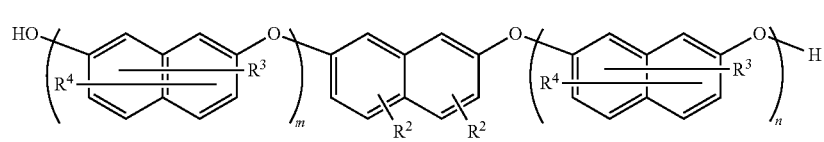

General Formula (6)

wherein each $R^2$ or $R^4$ represents independently a hydrogen atom or an $C_{1-4}$ alkyl group;

n and m each represent an integer of from 0 to 2, and at least one of n and m is 1 or greater;

$R^3$ represents a hydrogen atom or an aromatic hydrocarbon group containing a hydroxyl group represented by the following general formula (2-2):

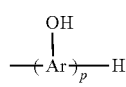

General Formula (2-2)

wherein, each Ar represents independently a naphthylene group, a phenylene group, or a naphthylene group or a phenylene group having an $C_{1-4}$ alkyl group or a phenyl group as a substituent; and p represents an integer of 1 or 2;

provided that the total number of aromatic nuclei in the formula (6) is from 2 to 8; and in the general formula (6), a position of bonding to the naphthalene structure part may be any of two benzene rings forming the naphthalene structure part.

12. A semiconductor-encapsulating material, comprising the epoxy resin composition according to any one of claim 11, wherein the epoxy resin composition further comprises an inorganic filler (C) in a ratio of 70 to 95 weight% in the composition in addition to said phenol resin (B') and said epoxy resin (A').

13. A cured article, which is formed by curing the epoxy resin composition according to any one of claim 11.

14. A novel epoxy resin, having a structure represented by the following general formula (5):

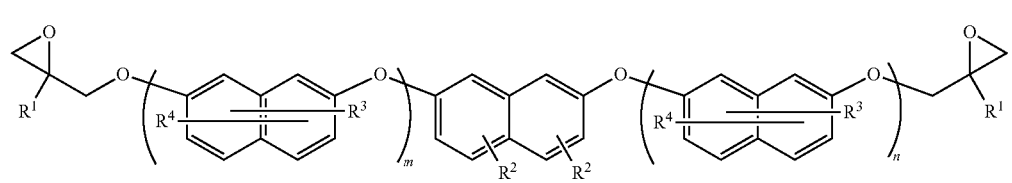

General Formula (5)

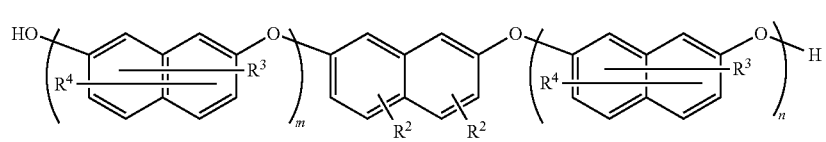

General Formula (6)

wherein, $R^1$ represents a hydrogen atom or a methyl group;

each $R^2$ or $R^4$ represents independently a hydrogen atom or a $C_{1-4}$ alkyl group;

n and m each represent an integer of from 0 to 2, and at least one of n and m is 1 or greater;

$R^3$ represents a hydrogen atom or an aromatic hydrocarbon group containing an epoxy group represented by the following general formula (1-2):

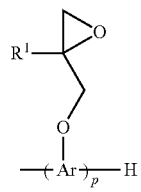

General Formula (1-2)

wherein, $R^1$ represents a hydrogen atom or a methyl group;

each Ar represents independently a naphthylene group, a phenylene group, or a naphthylene group or a phenylene group having a $C_{1-4}$ alkyl group or a phenyl group as a substituent; and p represents an integer of 1 or 2 ;

provided that the total number of the aromatic nuclei in the formula (5) is from 2 to 8; and in the above general formula (5), a position of bonding to the naphthalene structure part may be any of two benzene rings forming the naphthalene structure part.

15. A novel phenol resin, having a structure represented by the following general formula (6):

wherein each $R^2$ or $R^4$ represents independently a hydrogen atom or an alkyl group of a carbon number of from 1 to 4;

n and m each represent an integer of from 0 to 2, and at least one of n and m is 1 or greater;

$R^3$ represents a hydrogen atom or an aromatic hydrocarbon group containing a hydroxyl group represented by the following general formula (2-2):

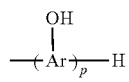

General Formula (2-2)

wherein, each Ar represents independently a naphthylene group, a phenylene group, or a naphthylene group or a phenylene group having a $C_{1-4}$ alkyl group or a phenyl group as a substituent; and p represents an integer of 1 or 2;

provided that the total number of the aromatic nuclei in the formula (6) is from 2 to 8; and in the formula (6), a position of bonding to the naphthalene structure part may be any of two benzene rings forming the naphthalene structure part.

\* \* \* \* \*